United States Patent
Okabe et al.

(10) Patent No.: US 7,988,745 B2
(45) Date of Patent: Aug. 2, 2011

(54) METHOD FOR MANUFACTURING BATTERY, BATTERY MANUFACTURED BY THE METHOD, AND METHOD FOR INSPECTING BATTERY

(75) Inventors: Kazuya Okabe, Kyoto (JP); Satoshi Yokota, Kyoto (JP); Takahiro Itagaki, Kyoto (JP); Tomonori Kishimoto, Kyoto (JP); Shuichi Izuchi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 459 days.

(21) Appl. No.: 12/223,717

(22) PCT Filed: Feb. 7, 2007

(86) PCT No.: PCT/JP2007/052544
§ 371 (c)(1),
(2), (4) Date: Aug. 7, 2008

(87) PCT Pub. No.: WO2007/091717
PCT Pub. Date: Aug. 16, 2007

(65) Prior Publication Data
US 2009/0233174 A1    Sep. 17, 2009

(30) Foreign Application Priority Data
Feb. 7, 2006  (JP) ................... 2006-030130

(51) Int. Cl.
H01M 2/26 (2006.01)
H01M 10/04 (2006.01)

(52) U.S. Cl. ............ 29/623.1; 29/623.2; 429/163
(58) Field of Classification Search ............ 29/623.1, 29/623.2, 730, 731; 429/163, 164, 172, 175, 429/176
See application file for complete search history.

(56) References Cited

U.S. PATENT DOCUMENTS
6,465,122 B1 * 10/2002 Kitaoka et al. .............. 429/54

FOREIGN PATENT DOCUMENTS
| JP | 2000268887 A | * | 9/2000 |
| JP | 2001-155710 | | 6/2001 |
| JP | 2002-260629 | | 9/2002 |
| JP | 2003028939 A | * | 1/2003 |
| JP | 2003-297335 | | 10/2003 |

* cited by examiner

Primary Examiner — Gregg Cantelmo
(74) Attorney, Agent, or Firm — Manabu Kanesaka

(57) ABSTRACT

A method for manufacturing highly reliable batteries includes the steps of placing in a battery container an electrode assembly; arranging an upper current collecting plate to be electrically connected to one of the electrodes of the electrode assembly; bringing a lead previously welded to the inner surface of a lid in contact with the upper current collecting plate; and welding the points of contact between the lead and the upper current collecting plate. Also batteries are produced by the method, and a method for inspecting battery including the steps of detecting defective welds by measuring alternating-current resistance of a battery.

7 Claims, 14 Drawing Sheets

Lid assembly (lid member + safety valve rubber + cap)

Lower current collecting plate central portion (a)

(b)

(c)

(a)          (b)

METHOD FOR MANUFACTURING BATTERY, BATTERY MANUFACTURED BY THE METHOD, AND METHOD FOR INSPECTING BATTERY

TECHNICAL FIELD

The present invention relates to a method for manufacturing batteries, a battery manufactured by the method and a method for inspecting a battery. More particularly, the present invention relates to an improvement in a structure that connects a lead connecting an upper current collecting plate of a battery to a lid, to an upper current collecting plate.

BACKGROUND ART

Alkaline batteries, such as nickel-hydride batteries and nickel-cadmium batteries, generally consist of a power-generating assembly housed in a battery case that serves as one of the electrode terminals. For example, as shown in FIG. 10, there is proposed a current collector that includes a current collecting plate 101 and a current collecting lead plate 103, which have the same thickness and are formed integrally with each other.

As shown in FIG. 11, this type of battery has a power-generating assembly in which a positive electrode plate 8 and a negative electrode plate 9 are spirally wound with a separator 10 disposed therebetween. The power-generating assembly is housed in a metallic battery case that serves as an outer container 6. A sealing assembly 11, welded at one point to a current collecting lead plate 103, is mounted at the opening of the battery case 6 to seal the opening. An insulation gasket is arranged between the sealing assembly 11 and the battery case 6.

When this type of alkaline battery is used in electric power tools, electric automobiles and other applications that repeat charge and discharge at a high rate, the electrical resistance of the current collector that connects between the power-generating assembly and the sealing assembly significantly affects the battery performance. Since these applications often require charging and discharging at high currents, the internal resistance of the battery must be minimized.

Batteries with decreased internal resistance are known as below: (See, for example, Patent Document 1) Patent Document 1 JP-A-2004-63272 (FIGS. 1 through 4, 10 and 11; paragraphs [0022] through [0038])

A nickel-cadmium battery based on the low internal resistance battery described in Patent Document 1 is now described.

FIG. 12 is a perspective view showing main components of a nickel-cadmium battery having a current collector integrally formed by blanking. FIGS. 13(a) and 13(b) are a plan view and a cross-sectional view of the current collector 1, respectively. The current collector is formed of a 0.3 mm-thick nickel-plated steel plate and includes a flat portion 2 and a projection 3 that is projected about 2.0 mm in height and formed by blanking.

The current collector is a substantially disk-shaped component with the top surface of the projection 3 being formed as a thin area 4 that serves as a weld area.

The flat portion includes bores 5 formed therein. Formed on the edge of each bore is a burr 5B that projects on the backside of the current collector and forms a weld point for welding to the positive electrode plate. FIG. 14 is a cross-sectional view showing the manner in which an electrode body is inserted into a battery case 6 which serves as an outer container and welded to a sealing assembly via the current collector 1.

As shown in FIG. 14, the nickel-cadmium battery includes a battery assembly in which a nickel positive electrode plate 8 and a cadmium negative electrode plate 9 are spirally wound with a separator 10 disposed therebetween. The battery assembly is housed in a battery case 6, which is a bottomed cylinder made of nickel-plated steel. The above-described current collector 1 is mounted on top of the battery assembly and a sealing assembly 11 is welded to the projection 3 of the current collector 1 by direct welding.

The sealing assembly 11 consists of a lid 12 having a circular projection projecting downward from the bottom thereof, a positive electrode cap 13, and a valve body disposed between the lid 12 and the positive electrode cap 13 and consisting of a spring 15 and a valve plate 14. A vent 16 is formed at the center of the lid.

As described, the edge of each of the bores 5 formed in the flat portion 2 is formed as the burr 5B that projects on the backside of the current collector 1 and forms a weld point for welding to the positive electrode plate 8. Before welding of the sealing assembly to the current collector 1, the nickel positive electrode plate is welded to the current collector 1 via these weld points. Disposed at the bottom of the battery case 6 is a disk-shaped negative electrode current collector 7 that is welded to the negative electrode plate 9. The opening part 17 of the battery case 6 is sealed by caulking.

According to the above-described construction, effective weld areas can be readily obtained simply by forming a single circular metal plate by punching out. As a result, firm and reliable connection can be achieved.

In addition, the connection resistance can be reduced since the flat portion 2, which serves as the current collecting body to be connected to the electrode, and the projection 3, which serves as the current collecting lead to be connected to the positive electrode terminal (sealing assembly), can be formed integrally.

As shown in FIG. 13(b), the welding current is concentrated to the thin top surface 4 of the projection 3. Also, the thin top surface has an elasticity that ensures that the weld area is firmly held under pressure. Thus, this construction further ensures firm connection.

Although the weld area can be firmly held under pressure according to the above-described method for manufacturing batteries, the pressure may vary significantly (for example, excessive pressure may apply) and the welding current may become insufficient, resulting in the formation of defective welds that are difficult to detect.

Other types of low internal resistance batteries are also known (See, for example, Patent Documents 2 and 3).
Patent Document 2: JP-A-2001-143684 (FIGS. 1, 14 and 15. As well as FIGS. 15, 16 and 17 of the drawings accompanying the present application)
Patent Document 3: JP-A-2001-155710 (FIGS. 3 and 4. As well as FIGS. 18 and 19 of the drawings accompanying the present application)

A low internal resistance battery described in Patent Document 2 has a structure shown in FIGS. 15, 16 and 17. The battery includes a cylindrical lead. One variation of this battery employs welding techniques that are described as follows: "The main body 21 of the cylindrical body 20 is arranged along the diameter of the positive electrode current collector 14 and wing-like portions 22, 22 are arranged on the positive electrode current collector 14. The wing-like portions 22, 22 are then welded to the positive electrode current collector 14 by spot-welding (First welding). "(paragraph

[0053]) "A press is operated to descend a punch P and press the seal portion of the sealing assembly 17 (the edge 16b of the open end of the battery case 16). At the same time, a voltage of 24V is applied between a pair of welding electrodes W1 and W2 in the direction of battery discharge to cause a 3 kA current to flow for about 15 msec while the welding electrodes W1 and W2 are being pressed at a pressure of $2 \times 10^6$ N/m$^2$ (Second welding). In this manner, the sealing assembly 17 is pushed into the battery case 16, and the bottom surface of the sealing assembly 17 and the periphery of the main body 21 of the cylindrical body 20 are welded together where they contact, forming welds." (paragraph [0056])

However, the second welding in manufacturing a battery requires a large welding current in order to weld the lead to the thick lid. If the welding current is excessively large, the resulting heat may cause the points of contact on the lead to meltdown. As a result, the close contact at the welds can no longer be maintained and the firmness of welding may be reduced, resulting in the formation of significantly varied welds. In addition, defective welds are often produced since the conditions for the welding are not properly determined. Such defective welds are difficult to detect.

Patent Document 2 also describes that "While in the foregoing embodiments and their variations, the cylindrical bodies 20, 30, 40, 50, 60 and 70 are first welded to the positive electrode current collector 14 and then welded to the sealing assembly 17 by passing a current between the positive electrode external terminal (positive electrode cap) 17a and the negative electrode external terminal (the bottom surface of the battery case 16), the cylindrical bodies 20, 30, 40, 50, 60 and 70 may first be welded to the sealing assembly 17 and subsequently welded to the positive electrode current collector 14 by passing a current between the positive electrode external terminal (positive electrode cap) 17a and the negative electrode external terminal (the bottom surface of the battery case 16). This gives the same results." (paragraph [0060]) However, Patent Document 2 provides no description as to what conditions are required to weld the sealing assembly (lid) to the cylindrical body (lead) first and then weld the positive electrode connector (upper current collector) to the lead.

Shown in FIGS. 18 and 19 is another low internal resistance battery described in Patent Document 3. As shown, the battery includes a battery case 16 that also serves as one of the electrode terminals and has an opening, a sealing assembly 17 (lid 17a, positive electrode cap 17b, spring 17c and valve body 17d) that also serves as the other of the electrode terminals and seals the opening of the battery case 16, a positive electrode plate 11 housed in the battery case 16, and an electrode body 10 having a negative electrode plate 12 at least one end of which is connected to a current collector 14. The sealing assembly 17 is connected and secured to the current collector 14 via a lead member, which consists of a rim-shaped cylindrical body 20 having a narrow central portion as viewed in the longitudinal direction. The rim-shaped cylindrical body 20 includes at the upper and lower ends thereof flanges 22, 23 that consist of wide portions 22a, 23a and narrow portions 22b, 23b formed alternately. The wide portions 22a are at a distance from the corresponding narrow portions 23b in an overlapping arrangement, whereas the narrow portions 22b are at a distance from the corresponding wide portions 23a in an overlapping arrangement.

A nickel-hydride rechargeable battery having the lead member consisting of the rim-shaped cylindrical body 20 is manufactured by using a welding technique according to the following description.

To assemble the nickel-hydride rechargeable battery, the above-described rim-shaped cylindrical body 20 was first placed on the positive electrode current collector 14. With welding electrodes (not shown) positioned at the outer periphery of the narrow portions 22b of the upper flange, the wide portions 23a of the lower flange were welded to the current collector 14 by spot-welding. Subsequently, the electrode body 10, consisting of the rim-shaped cylindrical body 20 welded to the positive electrode current collector 14, was inserted into the bottomed cylindrical battery case 16 made of nickel-plated steel (the outer surface of the bottom serves as the negative electrode external terminal). (paragraph [0025])

After the sealing assembly 17 was arranged as described above, one welding electrode W1 was arranged at the top surface of the positive electrode cap (positive electrode external terminal) 17a and the other welding electrode W2 was arranged at the lower side of the bottom of the battery case 16 (negative electrode external terminal). A voltage of 24V was then applied between the pair of welding electrodes W1 and W2 in the direction of battery discharge to cause a 3 kA current to flow for about 15 msec while the welding electrodes W1 and W2 were being pressed toward each other at a pressure of $2 \times 10^6$ N/m$^2$. In this manner, the current was concentrated to points of contact between the bottom surface of the sealing assembly 17 and the small projections 22c formed in the wide portions 22a of the upper flange 22 of the rim-shaped cylindrical body 20, so that the small projections 22c are welded to the bottom surface of the sealing assembly 17, forming welds. At the same time, the bottom surface of the negative electrode current collector 15 and the upper side of the bottom of the battery case 16 (negative electrode external terminal) were welded together where they contact, forming welds. (paragraph [0027])

Subsequently, an insulation gasket 19 was fitted to the periphery of the sealing assembly 17. Using a press, the sealing assembly 17 was pushed into the battery case 16 until the lower end of the insulation gasket 19 was positioned at the recess 16a. The edge of the open end of the battery case 16 was then caulked inward to seal the battery. This completed a cylindrical nickel-hydride rechargeable battery with a nominal capacity of 6.5 Ah. The pressure applied during the sealing process collapsed the main body 21 of the rim-shaped cylindrical body 20 at the narrow central portion. (paragraph [0028])

Another method for manufacturing a cylindrical nickel-hydride rechargeable battery with a nominal capacity of 6.5 Ah by welding before and after the sealing is also described as follows:

The above-described rim-shaped cylindrical body 20 was first placed on the positive electrode current collector 14. With welding electrodes (not shown) positioned at the outer periphery of the narrow portions 22b of the upper flange 22, the wide portions 23a of the lower flange 23 were welded to the current collector 14 by spot-welding. Subsequently, the electrode body 10, consisting of the rim-shaped cylindrical body 20 welded to the positive electrode current collector 14, was inserted into the bottomed cylindrical battery case 16 made of nickel-plated steel (the outer surface of the bottom serves as the negative electrode external terminal). (paragraph [0029])

Subsequently, an insulation gasket 19 was fitted about the periphery of the sealing assembly 17. Using a press, the sealing assembly 17 was pushed into the battery case 16 until the lower end of the insulation gasket 19 was positioned at the recess 16a. The edge of the open end of the battery case 16 was then caulked inward to seal the battery. The pressure applied during the sealing process collapsed the main body 21 of the rim-shaped cylindrical body 20 at the narrow central portion. One of the welding electrode W1 was arranged at the top surface of the positive electrode cap (positive electrode external terminal) 17a and the other of the welding electrodes W2 was arranged at the lower side of the bottom of the battery case 16 (negative electrode external terminal). (paragraph [0031])

A voltage of 24 V was then applied between the pair of welding electrodes W1 and W2 in the direction of battery discharge to cause a 3 kA current to flow for about 15 msec while the welding electrodes W1 and W2 were being pressed toward each other at a pressure of $2 \times 10^6$ N/m$^2$. In this manner, the current was concentrated to points of contact between the bottom surface of the sealing assembly 17 and the small projections 22c formed in the wide portions 22a of the upper flange 22 of the rim-shaped cylindrical body 20, so that the small projections 22c are welded to the bottom surface of the sealing assembly 17, forming welds. At the same time, the bottom surface of the negative electrode current collector 15 and the upper side of the bottom of the battery case 16 (negative electrode external terminal) were welded together where they contact, forming welds. (paragraph [0032])

However, the resulting battery has a problem that, when a large welding current is applied in order to weld the rim-shaped cylindrical body (lead) to the thick sealing assembly (lid), the welds of the positive electrode current collector (upper current collector) may break because of the large current, resulting in a decreased firmness of welding and a significant variation in the resistance of the lead. In addition, defective welds often produced since the conditions for the welding are not properly determined. Such defective welds are difficult to detect.

Batteries employing short conductive paths to reduce the internal resistance are also known (See, for example, Patent Documents 4 through 6).

Patent Document 4: JP-A-2004-259624 (FIG. 1. As well as FIG. 20 of the drawings accompanying the present application.)

Patent Document 5: JP-A-2004-235036 (FIGS. 6, 14 and 15. As well as FIGS. 21, 22 and 23 of the drawings accompanying the present application.)

Patent Document 6: JP-A-10-261397 (FIG. 1. As well as FIG. 24 of the drawings accompanying the present application.)

In batteries described in Patent Documents 4 through 6, a current collecting lead is welded between a terminal and an electrode. After sealing, the area that is to be caulked is press-fitted by pushing with a press. This brings the projections formed on the current collecting lead into contact with the opposing surface, thus completing a short conductive path. As a result, the current collecting resistance can be reduced.

Although the current collecting lead forms a short conductive path within the internal space as it is pressed and deformed, some of the current flows through other paths as reactive current upon welding of the current collecting lead to the contacts that form the short conductive paths. This makes it difficult to achieve firm welding and results in a significant variation in the resistance.

Furthermore, an oxide film may be formed on the short conductive path depending on the conditions under which the battery is used since the current collecting lead is exposed to the electrical potential of the positive electrode. As a result, the resistance may gradually increase during the use of the battery.

In a battery described in Patent Document 5, the short conductive path is welded before the battery is sealed by caulking the edge 16b of the open end of the outer container 16 inwardly. Thus, the resulting conductive path is not short enough to significantly reduce the resistance.

A battery described in Patent Document 6 is manufactured by a method including the following steps: sealing the opening of the battery case with the sealing assembly; and subsequently passing a current between the battery case and the sealing assembly to weld points of contact between the current collecting lead plate and the sealing assembly and thus form welds. This technique makes it possible to easily mount the sealing assembly to the opening of outer container even when the current collecting lead is short and to reduce the internal resistance of the battery by decreasing the current collecting distance. In addition, the technique eliminates the need to bend the current collecting lead upon sealing of the battery and thus allows the use of thick current collecting leads. This also facilitates the reduction of the internal resistance of the battery.

In the above-described technique, however, part of the current collecting lead plate leading from one of the positive and negative electrodes is brought into contact with the bottom surface of the sealing assembly and, subsequently, the current collecting lead plate and the sealing assembly are welded together where they contact, forming welds. The technique therefore cannot achieve firm welding. Also, the contact between the sealing assembly and current collecting lead cannot be ensured, nor can firm welds be formed by this technique when the height of the electrode body housed in the outer container varies since the current collecting structure described in examples cannot properly absorb the variation in the height of electrode body.

DISCLOSURE OF THE INVENTION

Problems to be Solved by the Invention

The above-described batteries, in which the top surface of the upper current collecting plate is welded to the inner surface of the sealing assembly (lid) via a lead, may be manufactured by first welding the lead to the upper current collecting plate and subsequently welding points of contact between the lead and the lid by passing a welding current between the positive electrode terminal and the negative electrode terminal of the battery. In such a case, the quality of welding between the lid and the lead tends to vary from battery to battery since the thick lid absorbs the heat required for welding.

These batteries may also be manufactured by first welding the lead to the lid and subsequently welding points of contact between the lead and the upper current collecting plate by passing a welding current between the positive electrode terminal and the negative electrode terminal of the battery. In such a case, the thin upper current collecting plate and the lead can readily be welded together by a small current, and the melting/breakage of welds due to excessive heating of the thin upper current collecting plate or the lead can be avoided. However, this technique often results in the formation of defective welds since the conditions for the welding are not properly determined. Such defective welds are difficult to detect.

Accordingly, objects of the present invention are to achieve low resistance welding, eliminate batteries with defective welds, and obtain highly reliable batteries in manufacturing batteries that uses a lead for connecting an upper current collecting plate to a sealing assembly (lid) and that are manufactured by first welding the lead to the lid and subsequently welding the points of contact between the lead and the upper current collecting plate by passing a welding current between a positive electrode terminal and a negative electrode terminal of the battery.

Means for Solving the Problems

In the course of our studies, the present inventors have found that the foregoing objectives can be achieved and the proportion of defective products can be significantly decreased by setting particular conditions for the welding of the lead to the upper current collecting plate. This finding ultimately led to the present invention.

To achieve the above-described objects, the present invention employs the following constructions:

(1) A method for manufacturing a battery, characterized by comprising the steps of: placing in a battery container an electrode assembly including a positive electrode plate and a negative electrode plate; arranging an upper current collecting plate electrically connected to one of said electrodes of the electrode assembly on said electrode assembly; bringing a lead previously welded to the inner surface of a lid in contact with said upper current collecting plate; and welding a point of contact between said lead and said upper current collecting plate, in that the point of contact between said lead and said upper current collecting plate is welded by passing a current between a positive electrode terminal and a negative electrode terminal of the battery while said lead is subjected to a compressive stress exceeding the elastic deformation range of the lead.

(2) The method according to (1) above, characterized in that said lead is a nickel-plated cold rolled steel plate.

(3) The method according to (1) above, characterized in that said lead is a nickel plate having 99% or a higher purity.

(4) The method according to any one of (1) to (3) above, characterized in that said compressive stress is in the range of 30N to 40N per point of contact between said lead and said upper current collecting plate.

(5) The method according to any one of (1) to (4) above, characterized in that said lead includes a platelike frame and a side wall that obliquely extends downward from the inner periphery of said frame in a narrowing fashion; said side wall includes peripherally spaced-apart slits formed longitudinally from the lower end thereof; said frame is welded to the inner surface of said lid; and the point of contact between said lead and said upper current collecting plate is arranged at the lower end portion of said side wall.

(6) The method according to (5) above, characterized in that said lead further includes a bottom portion that extends from the inner periphery of the lower end of said side wall; said side wall and said bottom portion include peripherally spaced-apart slits formed longitudinally from the lower end thereof; and the point of contact between said lead and said upper current collecting plate is arranged in said bottom portion.

(7) The method according to any one of (1) to (6) above, further comprising the step of: subsequent to the step of welding the point of contact between said lead and said upper current collecting plate, displacing the lead by 0.2 mm or greater amount in a direction that releases the compressive stress applied to said lead and removing the stress.

(8) The battery manufactured by the method according to any one of (1) to (7) above.

(9) A method for inspecting a battery, characterized by comprising the step of: detecting defective welds by measuring alternating-current resistance of a battery manufactured by the method according to any one of (1) to (7) above.

(10) The method according to (9) above, characterized in that the defective welds are detected by measuring the alternating-current resistance of the battery after the compressive stress applied to said lead is removed.

Advantage of the Invention

According to the present invention, firm welding is achieved in manufacturing batteries such as sealed batteries since the lead is welded to the adjacent upper current collecting plate while the lead is subjected to a compressive stress exceeding the elastic deformation range of the lead. The welding achieved by conventional technologies in these batteries has been unstable thus far. The present invention also provides high power density batteries while minimizing the proportion of defective products.

EXPLANATION OF REFERENCE SYMBOLS

Figure 1:
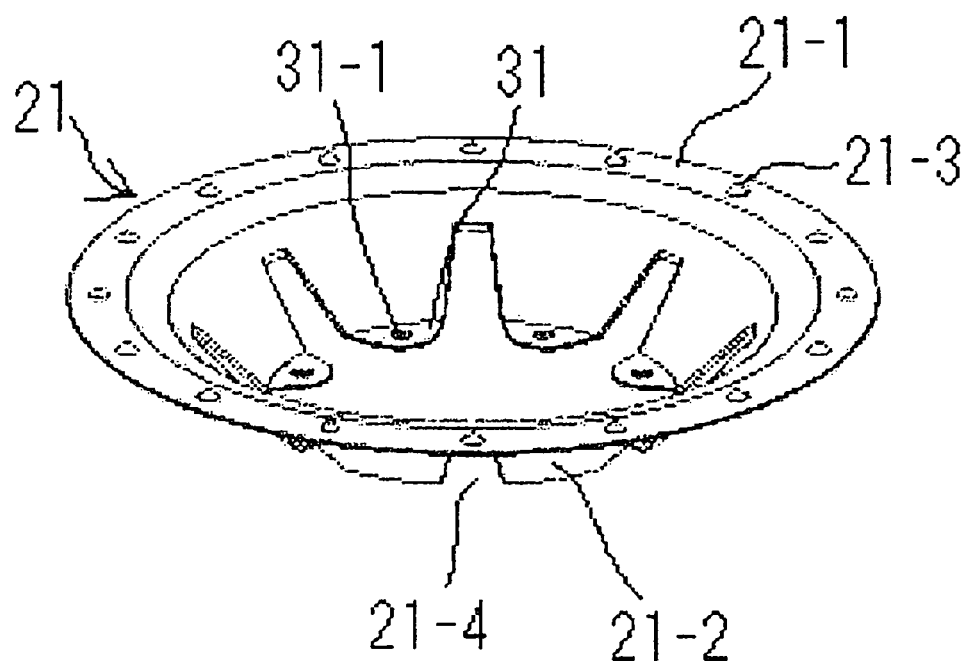
FIG. 1 is a perspective view showing one example (e.g., Example 1) of a lead including a frame (with 16 projections for welding), and a side wall and a bottom portion having slits formed therein (with 8 projections for welding)

21: lead including a frame and a side wall having slits formed therein
21-1: frame
21-2: side wall of lead 21
21-3: projection for welding formed on frame
21-4: slit formed in side wall and bottom portion
31: bottom portion
31-1: welding projection formed on bottom portion
2: upper current collecting plate (positive electrode current collecting plate)
2-1: weld point to lead formed on upper current collecting plate
2-2: slit formed on upper current collecting plate
2-3: knob on upper current collecting plate (for engagement with an electrode)
50: lid
51: position on inner surface of lid corresponding to cap end
60: battery container
70: electrode assembly
80: cap
90: valve body
100: lower current collecting plate (negative electrode current collecting plate)

BEST MODE FOR CARRYING OUT THE INVENTION

Figure 2:
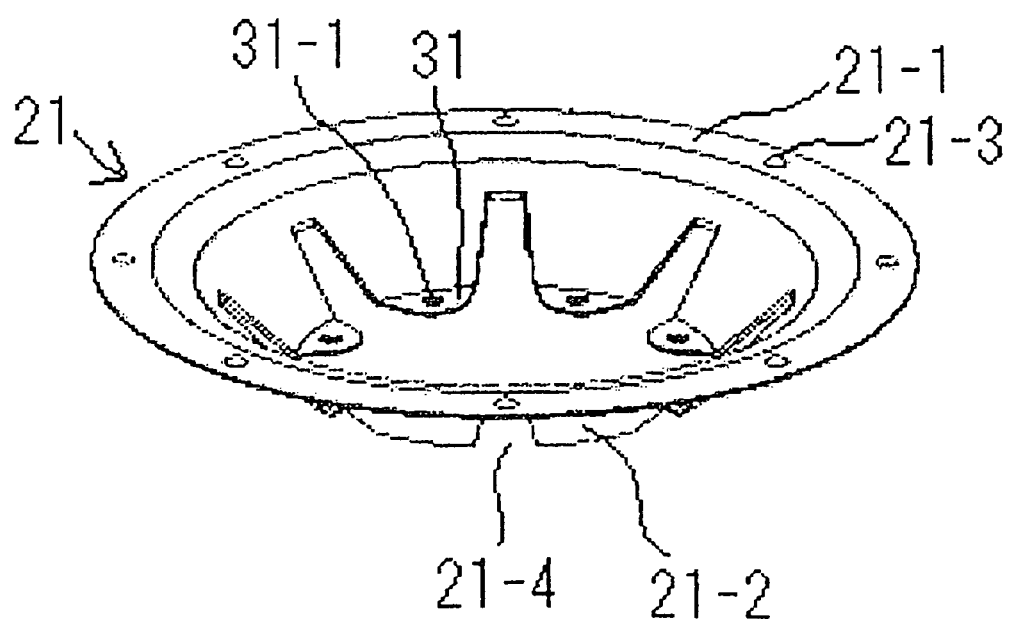
FIG. 2 is a perspective view showing another example of the lead including a frame (with 8 projections for welding), and a side wall and a bottom portion having slits formed therein (with 8 projections for welding)

The present inventors have conducted an analysis of the resistance components of sealed batteries and demonstrated that the resistance of a lead accounts for a significant proportion of the internal resistance of a sealed battery. Thus, the present inventors have conducted studies to minimize the length of the lead that connects the lid and the upper current collecting plate and thereby to decrease the lead resistance. These studies have shown that the resistance of the connection between the lid and the upper current collecting plate can be significantly decreased, as compared to when the leads having structures shown in FIGS. 13, 15, 18 and 23 are used, by using leads as shown in FIGS. 1 and 2 and passing a current between the positive electrode terminal and the negative electrode terminal of a battery while the lead pre-welded to the lid is held in contact with the upper current collecting plate.

However, this technique has a problem that the pressure exerted to the point of contact between the lead and the upper current collecting plate tends to vary, often resulting in the formation of defective welds. When the pressure exerted to the points of contact is small, the points of contact tend to have high resistance, so that the welding current produces a large amount of heat, which causes the weld points to burst. When the pressure exerted to the points of contact is large, the points of contact tend to have low resistance, so that the welding current produces less heat, resulting in insufficient welding of the weld points.

In the course of our studies to stabilize the pressure exerted to the points of contact that are to be welded, the present inventors have found that, surprisingly, the pressure is stabilized under specific conditions.

The conditions are as follows:

To stabilize the formation of welds upon welding of the lead to the upper current collecting plate, the present inventors applied a compressive stress exceeding the reversible elastic deformation range of the lead, that is, a compressive stress at which the lead undergoes irreversible plastic deformation, and found that the application of such compressive stress significantly decreases the variation in the pressure exerted on the point of contact between the lead and the upper current collecting plate.

Thus, according to the manufacturing method of the present invention, even if variation in the height of electrodes or in the height of batteries occur, such displacements would be absorbed by the lead as it undergoes irreversible plastic deformation. Also, the pressure exerted to the points of contact is stabilized.

In the batteries obtained by the manufacturing method of the present invention, the lead remains compressed after completion of the batteries. This is because the amount of the compression of the lead (the decrease in the height of the lead) is significantly greater than the amount of outward bending of the lid. The bending of the lid is caused by the outward load that the lead exerts on the lid and is therefore inevitable. In batteries manufactured by conventional methods, the compression of the lead was often released due to the bending of the lid.

The lead suitable for use in the manufacturing method of the present invention preferably is of a material and shape that have minimum resilience. For example, nickel-plated steels are preferably used. In particular, nickel-plated cold rolled steel plates (Material Code: SPCC/JISG3141) and nickel plates having 99% or higher purity (Type: N201 1/2H) are preferred because of their low resilience. The stability of welding is significantly improved by using these plates since the stress generated in these plates is highly stable and varies little upon irreversible plastic deformation of the plates.

According to the inspection method of the present invention, the defective welding of the point of contact between the lead and the upper current collecting plate is detected by measuring the alternating-current resistance of the battery. The alternating-current resistance is preferably measured after the compressive stress applied to the lead has been removed. The removal of compressive stress can be done by first welding the points of contact between the lead and the upper current collecting plate and then displacing the lead by 0.2 mm or greater amount in the direction that releases the stress. Since the resistance increases in defective points of contact by the removal of compressive stress, the defective welds can be detected with high accuracy by measuring the alternating-current resistance of the battery.

A lead (dish type) for use in the manufacturing method of the present invention will now be described with reference to FIGS. 1 and 2.

FIGS. 1 and 2 each show a lead formed by blanking and bending of a 0.3 mm-thick Ni or FeNi (nickel-plated steel) plate. While the leads in these figures are each bent into a substantially circular dish, the ring portion of the lead does not necessarily have to be circular; it may have polygonal or other shapes.

The lead (21) shown in FIGS. 1 and 2 has a platelike frame (21-1), a side wall (21-2) extending obliquely downward from the inner periphery of the platelike frame (21-1) in a narrowing fashion, and a bottom portion (31) extending from the inner periphery of the lower end of the side wall. The side wall (21-2) and the bottom portion (31) include peripherally spaced-apart slits (21-4) formed longitudinally from the lower end of the lead.

Preferably, two or more slits (21-4) are formed peripherally and equally spaced-apart from one another. The slits (21-4) may be formed in the side wall (21-2) without providing the bottom portion (31).

In this manner, when the lid and the upper current collecting plate are pressurized, the portions of the lead between the slits (21-4) of the side wall (21-2), or of the side wall (21-2) and the bottom portion (31) when the bottom portion is provided, are bent inward so that they come close to each other. As a result, the variation in the height of the electrodes or the batteries is absorbed and the contact pressure (pressure exerted to the points of contact) is maintained in an optimum range.

The leads shown in FIGS. 1 and 2 each include projections (21-3) formed on the flame (21-1) for welding to the lid (50). As projections for welding the points of contact between the leads (21) and the upper current collecting plate (2), the leads (21) also include projections (31-1) on the part of the bottom portion (31) between the slits (21-4).

Each of the projections (21-3) formed on the frame (21-1) is preferably 0.5 to 1.0 mm in diameter and 0.5 mm or more in height to facilitate the projection welding. Preferably, two or more projections are formed to decrease the resistance of the welds.

Each of the projections (31-1) formed on the bottom portion (31) is preferably 0.5 to 1.0 mm in diameter and 0.5 mm or more in height to facilitate the projection welding. Preferably, two or more projections are formed to ensure firm welding. More preferably, four or more projections are formed to decrease the resistance of the welds.

According to the manufacturing method of the present invention, the upper current collecting plate is preferably formed of a metal that is hardly oxidized, or coated or plated with such a metal since it will become difficult to weld the points of contact between the current collecting plate and the lead within the battery if the points of contact are covered with an oxide film or the like. The points of contact between the parts that form the current path are preferably plated with nickel metal since nickel hardly corrodes in an alkaline electrolyte solution and possesses high weldability.

According to the manufacturing method of the present invention, if the battery is charged or discharged after injection of the electrolyte solution, then the electrical potential of the positive electrode may cause the surface of the positive electrode current collecting plate or the lead to be oxidized depending on the conditions for the charge and discharge. Since this may result in unstable welding, the welding in the manufacturing method of the present invention is preferably carried out after injection of the electrolyte solution and before the initial charge that causes changes in the electrical potential of the positive electrode.

Figure 3:
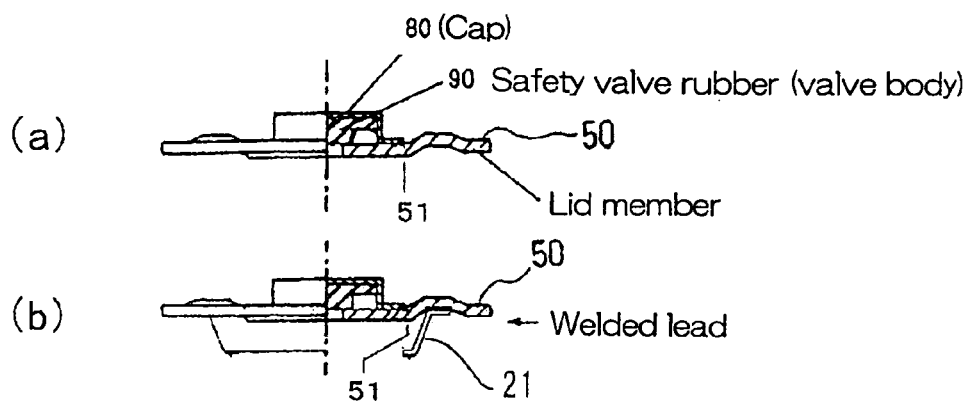
FIG. 3 is a diagram showing one example of sealed battery in which a lead (having the frame and the side wall with slits) is welded to a lid and an upper current collecting plate.
Figure 3:
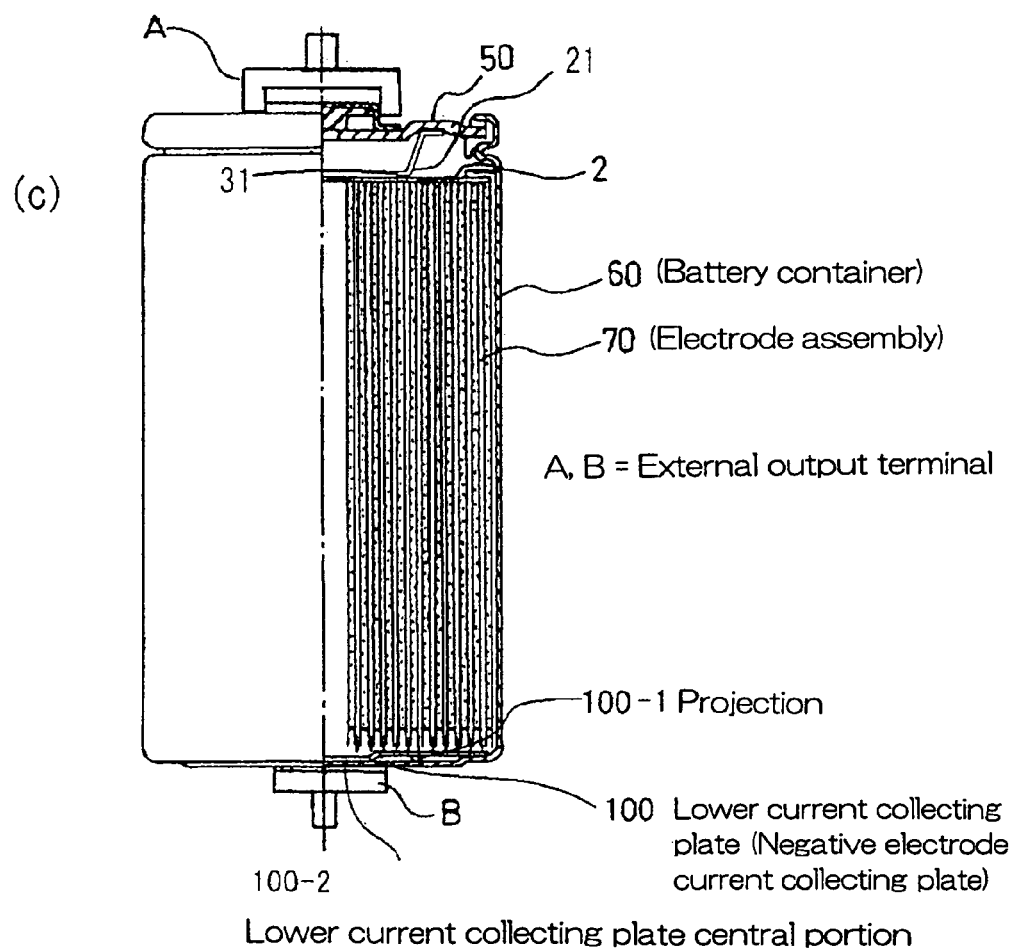

FIG. 3 shows an assembly drawing of a sealed battery having a lead which is one example of the present invention welded thereto.

In FIG. 3, (a) is a cross-sectional view of an exemplary structure of the lid (50) including a bare lid member with a cap (80) placed on top of it to cover the center part thereof. A safety valve rubber (valve body) (90) is disposed between the lid member and the cap (80).

(b) shows the lead (21) pre-welded to the lid (50).

(c) shows the sealed battery in which the lead (21) pre-welded to the lid (50) as shown in (b) is welded to the current collecting plate (2) of the sealed battery.

According to the present invention, the weld points of the lead (21) on the inner surface of the lid (50) are preferably positioned outside the position (51) on the inner surface of the lid that corresponds to the cap end. The flow path of the current can be made short and the internal resistance can be reduced when the points of contact through which the current flows outside the battery are positioned outside the cap end placed on top of the lid. As a result, the power density is increased.

According to the present invention, a large current is passed between the positive and the negative electrodes, though for a very short time, upon welding of the current collecting plate to the lead. The passed charge is stored in the electrical double layers of the positive electrode plate and the negative electrode plate, causing electrolysis of the electrolyte solution. To prevent this electrolysis, the welding current is preferably provided as pulses of alternating current.

In the manufacturing method of the present invention, a large welding current must be applied to perform welding when the pressure exerted to the point of contact is high and, thus, less heat is generated by the welding current. However, too large a current will melt and break the point of contact. Conversely, when the pressure exerted to the point of contact is small, much heat is generated by the welding current, so that a small current is enough to perform welding. However, too small a current cannot properly weld the point of contact.

Thus, the pressure (compressive stress) exerted to the point of contact and the welding current are preferably adjusted within predetermined ranges so that a specific relationship holds between the pressure and the welding current.

Figure 9:
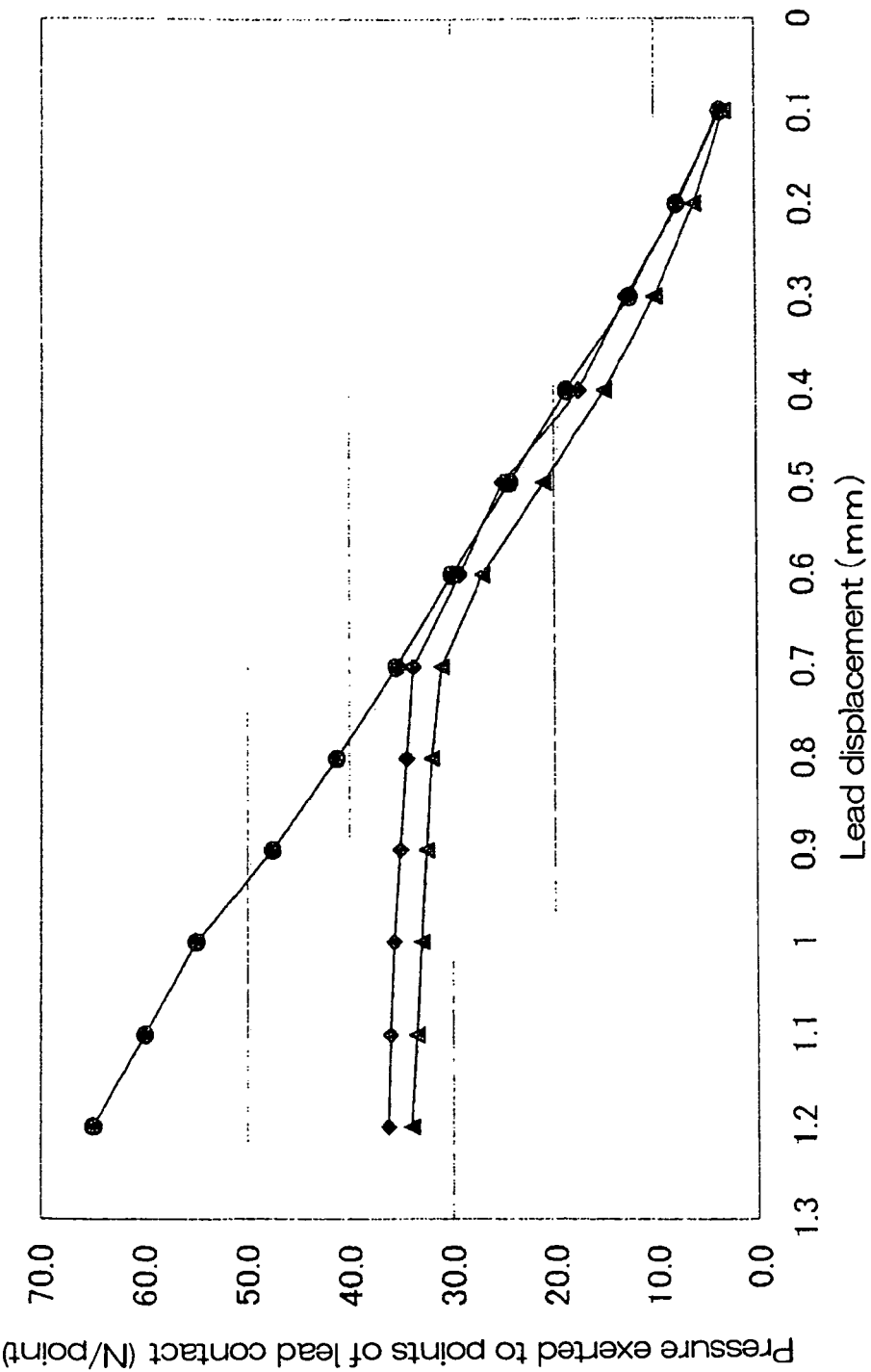
FIG. 9 is a graph showing a relationship between the displacement of the lead and the pressure.
Figure 10:
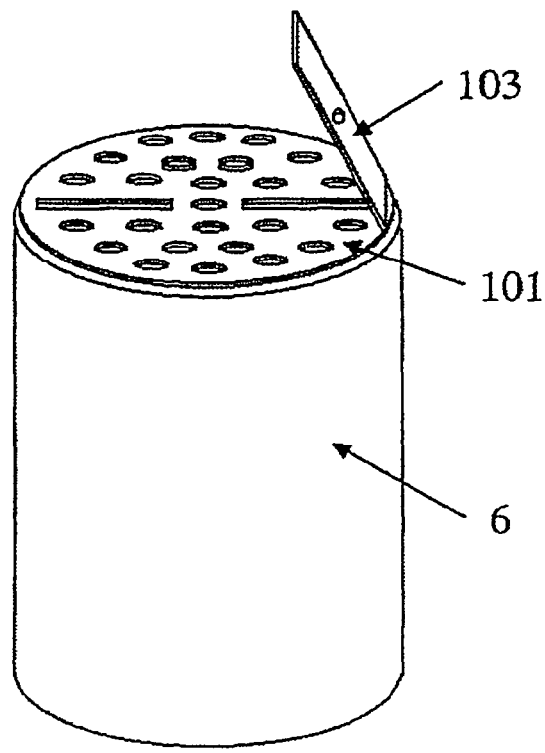
FIG. 10 is a perspective view showing one example of a conventional current collecting structure consisting of a current collector integrally formed with a current collecting lead having the same thickness as the current collector.
Figure 11:
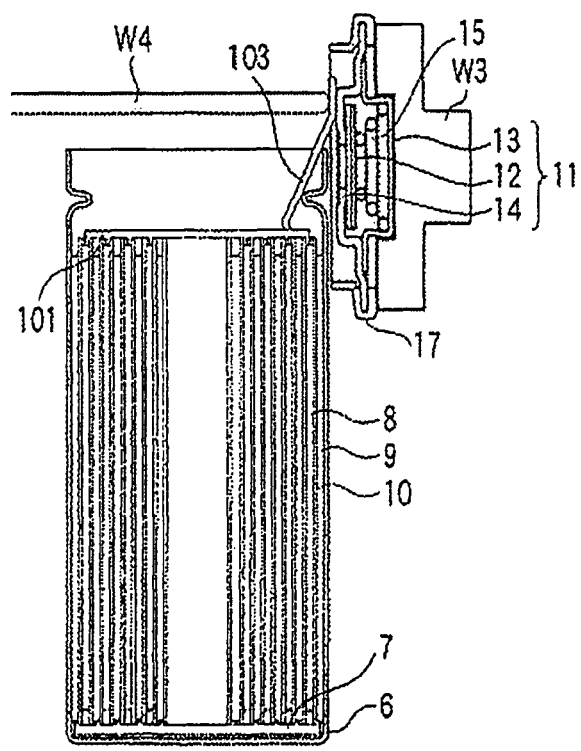
FIG. 11 is a cross-sectional view of a conventional sealed battery in which the current collecting lead of FIG. 10 is welded to the sealing assembly.
Figure 12:
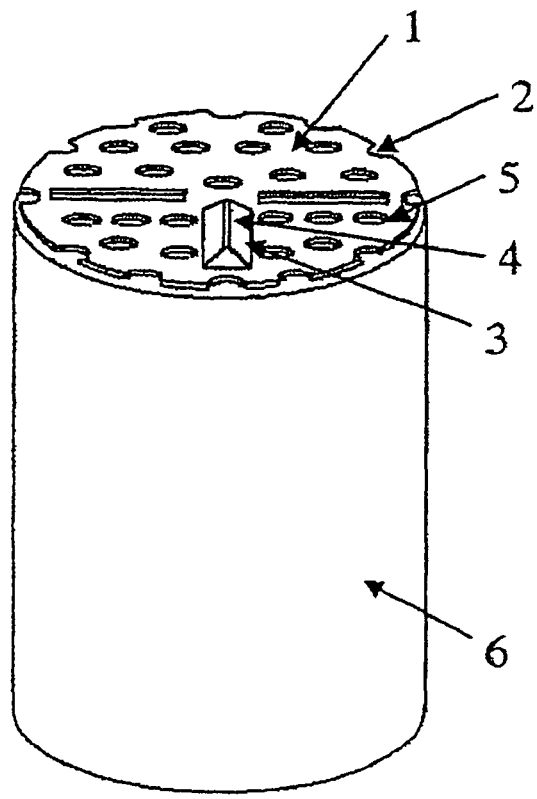
FIG. 12 is a perspective view showing main components of a nickel-cadmium battery incorporating a current collector integrally formed by a conventional blanking process.
Figure 13:
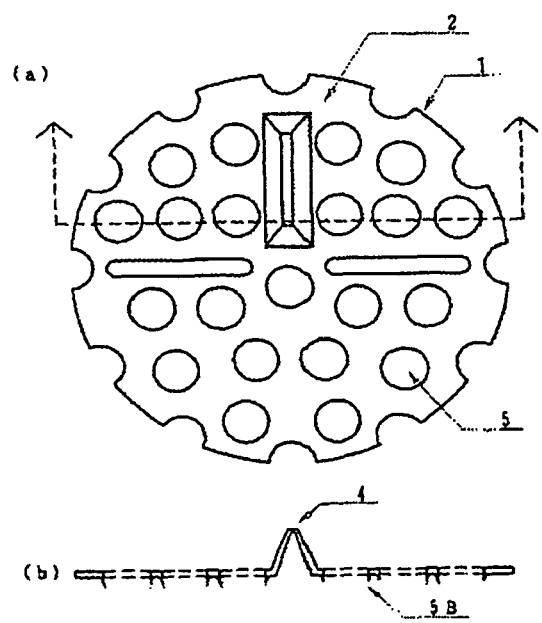
FIG. 13 shows a plan view and a cross-sectional view of the current collector integrally formed by the conventional blanking process.
Figure 14:
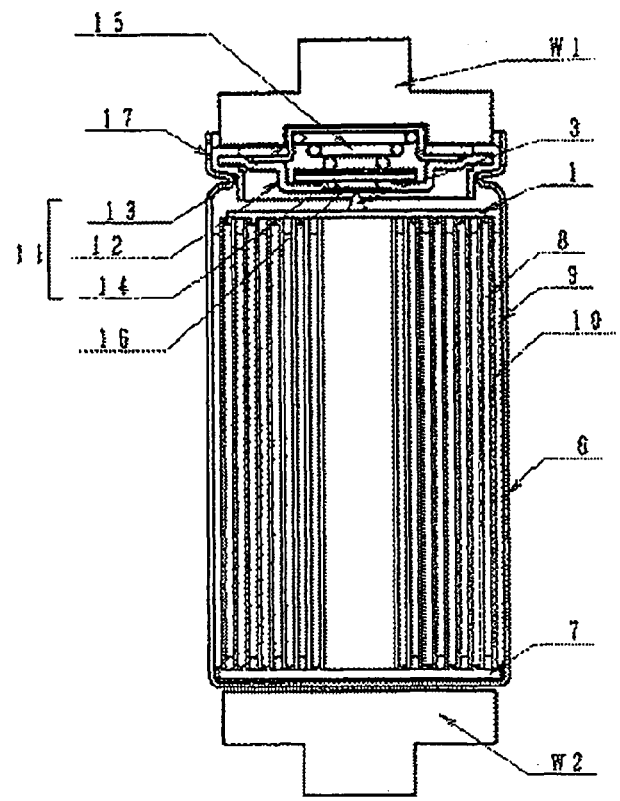
FIG. 14 is a cross-sectional view showing the manner in which an electrode body placed in the battery case is welded to a sealing assembly via the current collector of FIG. 13.
Figure 15:
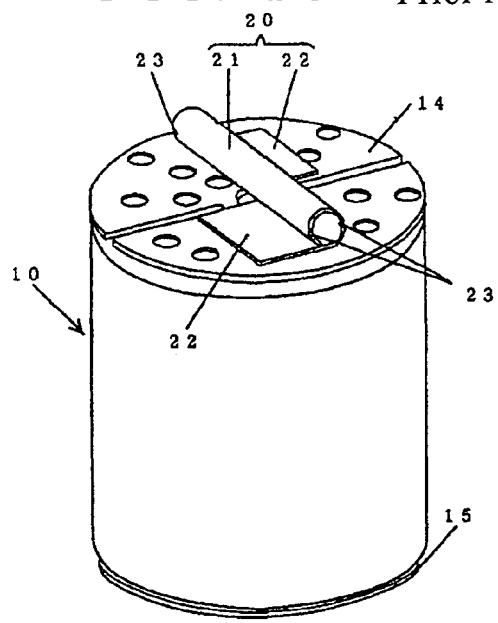
FIG. 15 is a perspective view showing the manner in which a conventional cylindrical body forming a lead member is welded to an electrode body.
Figure 16:
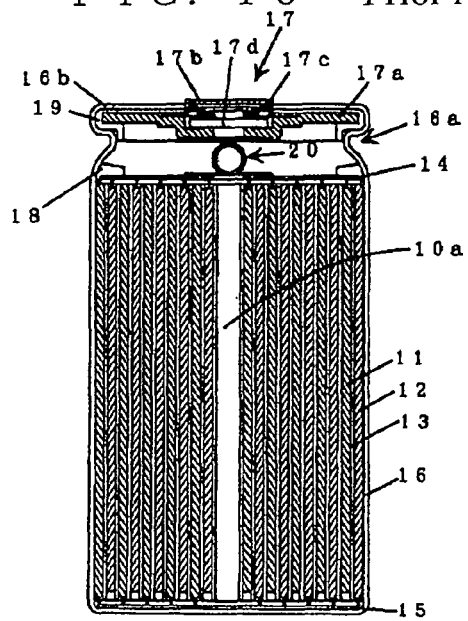
FIG. 16 is a cross-sectional view showing the manner in which the cylindrical body forming the lead member of FIG. 15 is used to seal the opening of a battery case with a sealing assembly.
Figure 17:
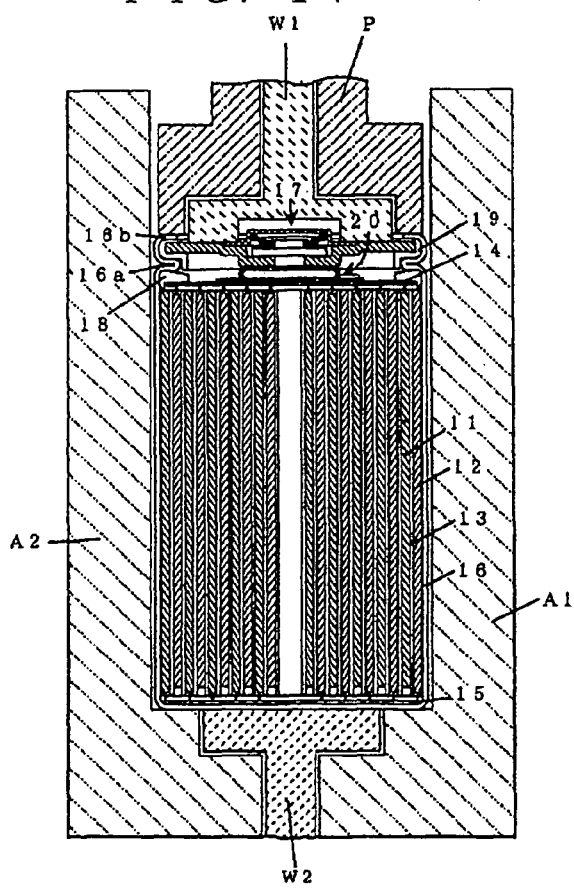
FIG. 17 is a cross-sectional view showing the manner in which the cylindrical body forming the lead member of FIG. 15 is welded to the sealing assembly, as well as the manner in which a seal portion is pressed.
Figure 18:
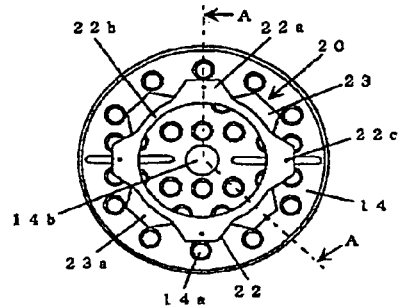
FIG. 18 shows a plan view, a side view and a cross-sectional view of a conventional lead member consisting of a rim-shaped cylindrical body.
Figure 18:
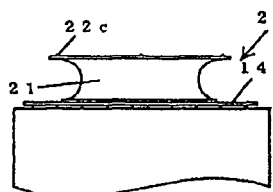
Figure 18:
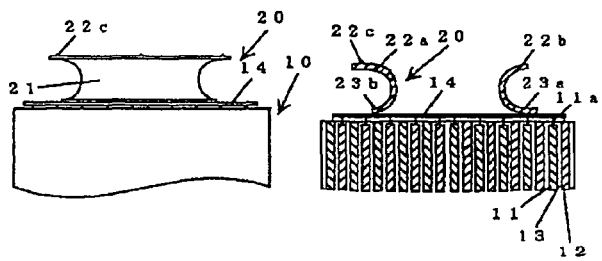
Figure 19:
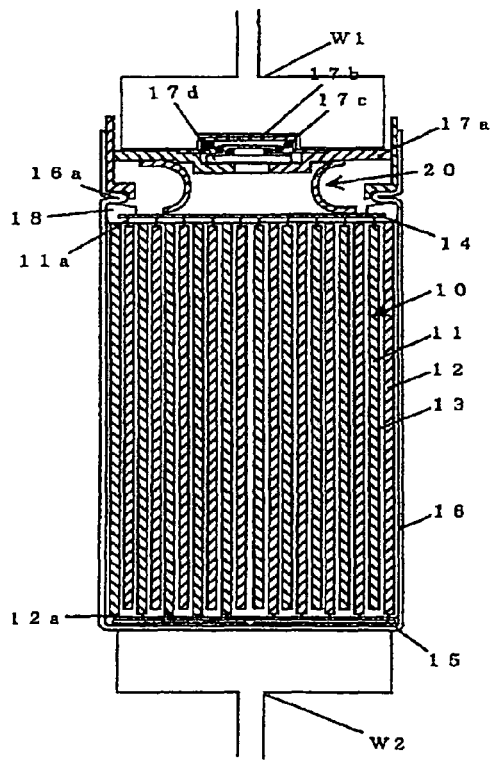
FIG. 19 is a cross-sectional view showing the manner in which an electrode body placed in a battery case is welded to a sealing assembly via the lead member of FIG. 18.
Figure 20:
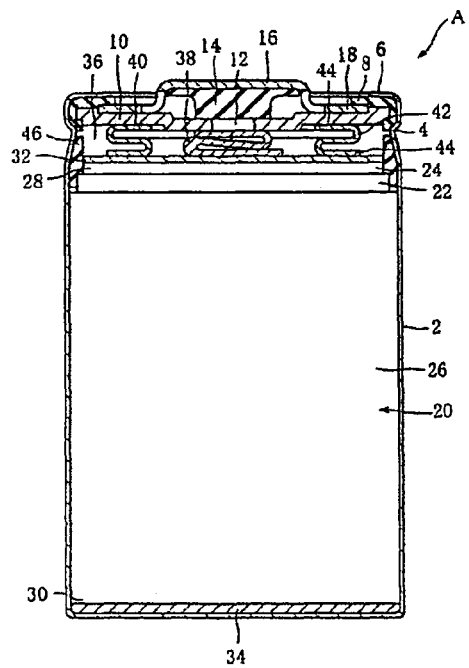
FIG. 20 is a cross sectional view of a conventional sealed battery having a bent current collecting lead.
Figure 21:
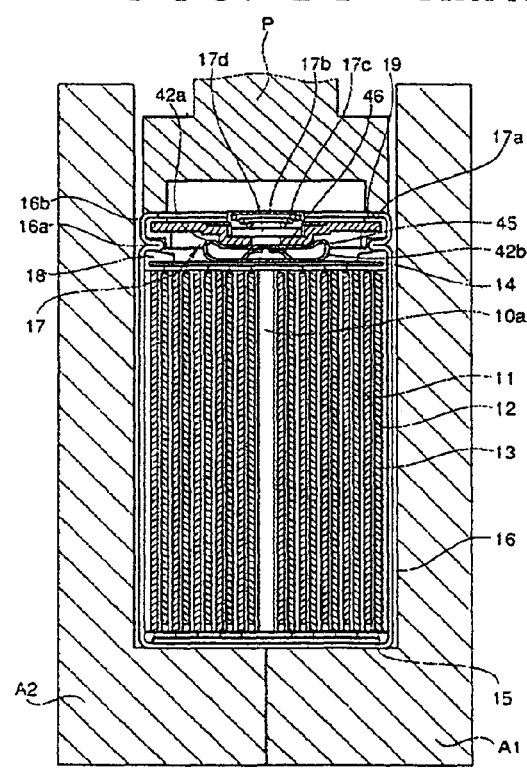
FIG. 21 is a cross-sectional view showing the manner in which the seal portion of the conventional sealed battery having a current collecting lead with a short conductive path is pressed.
Figure 22:
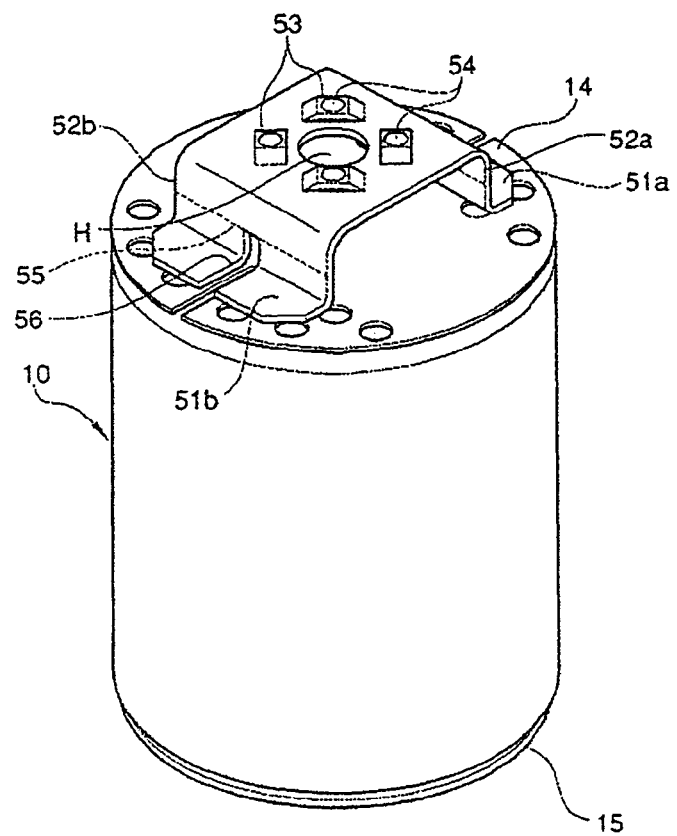
FIG. 22 is a perspective view showing the manner in which the conventional current collecting lead with a short conductive path is welded to an electrode body.
Figure 23:
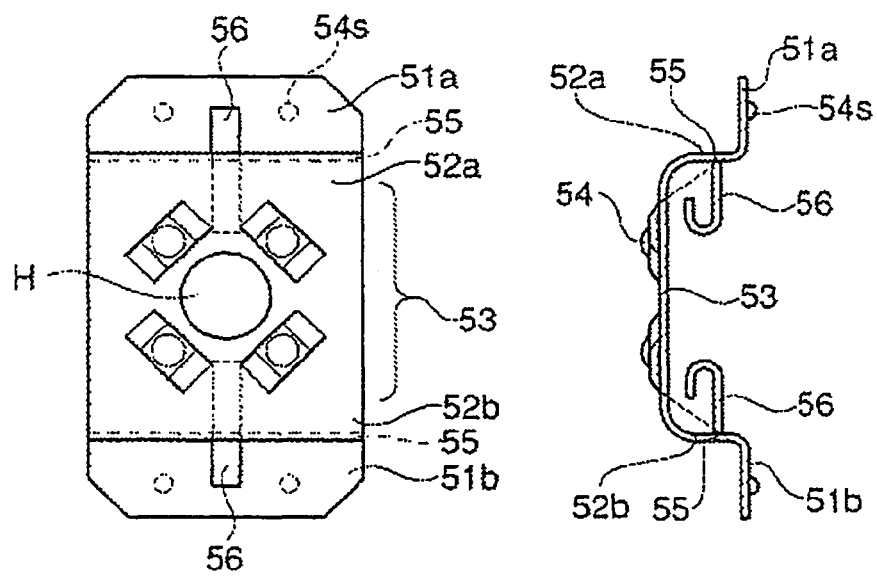
FIG. 23 shows a top view and a side view of the conventional current collecting lead with a short conductive path.
Figure 24:
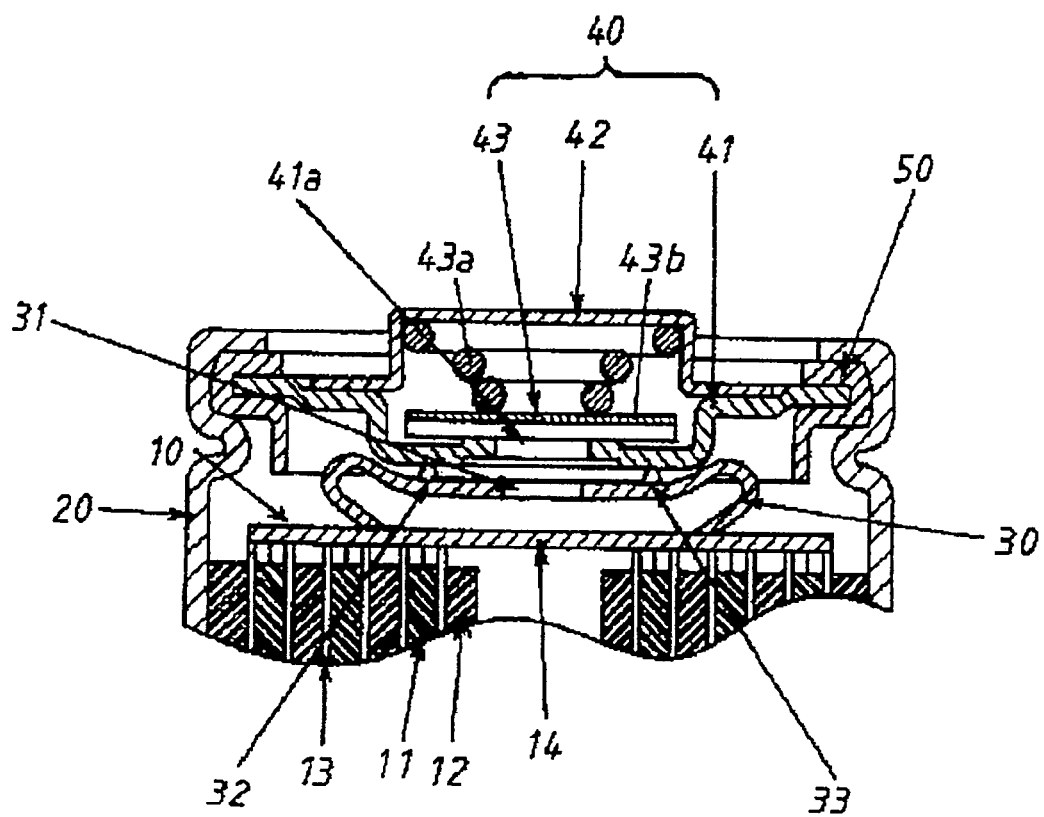
FIG. 24 is a cross-sectional view showing main components of a nickel-cadmium battery in which the contacts between a current collecting lead plate and a sealing assembly were welded to form welds after conventional sealing process.

To ensure stable welding, as shown in FIG. 9, the pressure is in the range of 30 N to 40 N per point of contact between the lead and the upper current collecting plate. To further stabilize welding, the welding current is preferably an alternating current pulse of 200 to 300 Hz and the welding current is preferably between 600 and 700 A.

When the pressure is higher than the above-described range, the current is increased to a value higher than the above-described range to ensure firm welding.

When the pressure is lower than the above-described range, the current is decreased to a value lower than the above-described range to ensure firm welding.

By adjusting the pressure to a range of 30 N to 40 N/per point of contact, the contact is stably held under pressure.

The pressure applied to the point of contact is also affected by the shape of the welding projections (31-1) of the lead. Further, the point of contact between the welding projection (31-1) and the upper current collecting plate (2) (FIGS. 6 through 8) preferably has a radius of 0.3 to 1.0 mm to ensure stable welding.

According to the present invention, passing a large current between the positive and the negative electrodes can provide firm welding without causing the electrolysis when the above-described electric double layer has a large capacitance. In the case of nickel-hydride rechargeable batteries, for example, the electric double layer of the negative electrode plate tends to have a smaller capacitance than the electric double layer of the positive electrode plate. This is probably due to the small specific surface area of the hydrogen-absorbing alloy powder used to form the negative electrode. For this reason, it is preferred in the manufacturing method of the present invention that the hydrogen-absorbing alloy powder be immersed in a weakly acidic aqueous solution, such as aqueous NaOH solution and aqueous acetic acid-sodium acetate solution, prior to incorporation into the batteries to increase the capacitance of the electric double layer of the negative electrode plate. The aqueous solution for immersion is preferably used at a high temperature.

The battery according to the present invention has a decreased internal resistance and is therefore adapted to rapid charging. Thus, it is preferred that its positive and negative electrodes be constructed to have a high charge acceptance.

In the case of nickel-hydride rechargeable batteries, for example, the active material used in the positive nickel electrode may be a mixture of nickel hydroxide with zinc hydroxide and cobalt hydroxide. A particularly preferred active material is a mixed hydroxide composed mainly of nickel hydroxide and obtained by co-precipitation of nickel hydroxide with zinc hydroxide and cobalt hydroxide. Rare earth elements, such as Y, Er and Yb, or compounds thereof are preferably added to the nickel electrode. The presence of these elements increases the oxygen overvoltage of the nickel electrode, so that the generation of oxygen at the nickel electrode during rapid charging is prevented.

Several embodiments of cylindrical sealed nickel-hydride rechargeable battery in accordance with the present invention will now be described with reference to examples, which are not intended to limit the scope of the invention.

Example 1

Preparation of Positive Electrode Plate

Ammonium sulfate and a sodium hydroxide aqueous solution were added to an aqueous solution containing nickel sulfate, zinc sulfate and cobalt sulfate at a predetermined ratio to form an ammine complex. While the reaction system was vigorously stirred, additional sodium hydroxide was added dropwise to adjust the pH of the reaction system to 11 to 12. This gave spherical high-density nickel hydroxide particles that serve as a core material and contain nickel hydroxide, zinc hydroxide and cobalt hydroxide at a ratio of 88.45:5.12:1.1, respectively.

The high-density nickel hydroxide particles were added to an aqueous alkali solution having the pH adjusted to 10 to 13 by sodium hydroxide. To the resulting mixture, an aqueous solution containing cobalt sulfate and ammonia at predetermined concentrations was added dropwise under stirring. During the addition, the pH of the reaction mixture was maintained at 11 to 12 by the dropwise addition of a sodium hydroxide aqueous solution. The pH was maintained at 11 to 12 for about 1 hour to form a surface layer of a Co-containing mixed hydroxide on the surface of the nickel hydroxide particles. The proportion of the surface layer of the mixed hydroxide was 4.0 wt % with respect to the core particles (referred to simply as "core," hereinafter).

50 g of nickel hydroxide particles having the surface layer of the mixed hydroxide were added to a 30 wt % (10N) sodium hydroxide aqueous solution at 110° C. and the mixture was thoroughly stirred. Subsequently, $K_2S_2O_8$ was added in excess of the molar equivalent of cobalt hydroxide present in the surface layer and the generation of oxygen gas from the surface layer was confirmed. The active material particles were collected by filtration, washed with water and dried.

To the resulting active material particles, an aqueous solution of carboxymethyl cellulose (CMC) was added to form a paste containing the active material particles and the CMC solute at a ratio of 99.5:0.5. A nickel foam (450 g/m$^2$, No. 8 Celmet manufactured by Sumitomo Electric Industries, Ltd) was impregnated with the paste, dried at 80° C., pressed to a predetermined thickness, and surface-coated with polytetrafluoroethylene to form a 47.5 mm (width, with 1 mm uncoated portion)×1150 mm (length) nickel positive electrode plate having a capacity of 6500 mAh (6.5 Ah).

(Preparation of Negative Electrode Plate)

A rare-earth hydrogen-absorbing alloy of AB$_5$-type having a particle size of 30 μm and a composition of MmNi$_{3.6}$Co$_{0.6}$Al$_{0.3}$Mn$_{0.35}$ was immersed in a 48 wt % aqueous NaOH solution (specific gravity measured at 20° C.) at 100° C. for 4 hours.

Subsequently, the treatment solution and the alloy were separated by pressure filtration. To the alloy, the same weight of pure water was added and the mixture was sonicated at 28 kHz for 10 minutes. While the mixture was gently stirred, pure water was introduced from the lower part of the stirring vessel to allow the water to overflow and thus remove the rare-earth hydroxide that had dissociated from the alloy. Subsequently, the alloy was washed with water until the pH was 10 or below and was then separated by pressure filtration. The separated alloy was exposed to warm water at 80° C. to eliminate hydrogen. The warm water was removed by pressure filtration, and the alloy was washed again with water and cooled to 25° C. To the cooled alloy, the same weight of 4% hydrogen peroxide was added under stirring and hydrogen was eliminated to give a hydrogen-absorbing alloy for electrodes.

The resulting alloy was mixed with a styrene-butadiene copolymer at a ratio (by weight of solid components) of 99.35:0.65 (alloy:copolymer). The mixture was dispersed in water to form a paste. Using a blade coater, the paste was applied to a punching steel plate formed of nickel-plated iron. The coated steel plate was dried at 80° C., pressed to a predetermined thickness to form a 47.5 mm (width)×1175 mm (length) hydrogen-absorbing alloy negative electrode plate having a capacity of 11000 mAh (11.0 Ah).

(Preparation of Sealed Nickel-Hydride Rechargeable Battery)

The preparation of a sealed nickel-hydride rechargeable battery will now be described with reference to FIG. 3.

Figure 4:
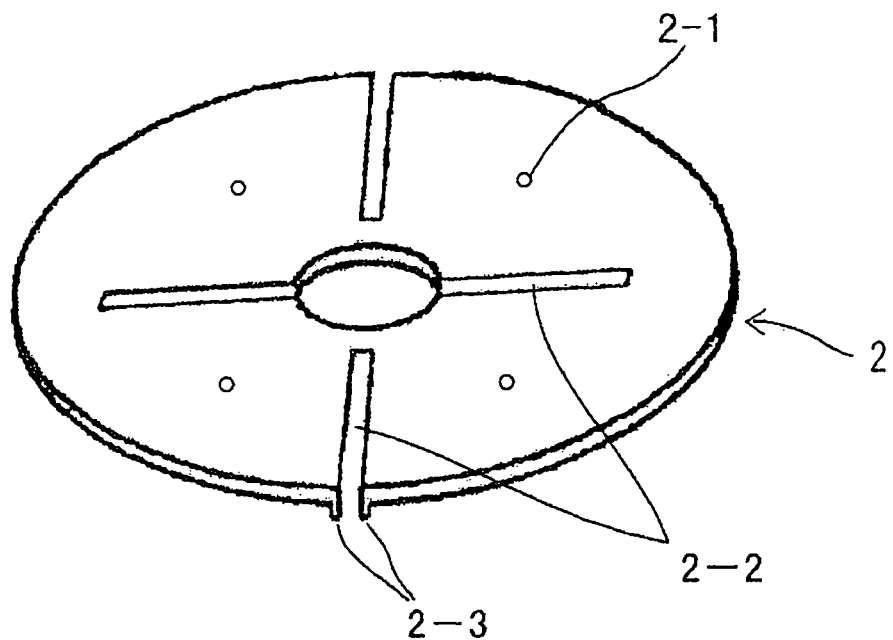
FIG. 4 is a diagram showing one example (e.g., Example 1) of an upper current collecting plate (positive electrode current collecting plate) for use in the present invention.

The negative electrode plate, a sulfonated 120 μm-thick polypropylene nonwoven fabric separator and the positive electrode plate were wound together in a roll to make an electrode assembly (70) 51.7 mm in height. A disk-shaped upper current collecting plate (positive electrode current collecting plate) (2) as shown in FIG. 4 was resistance-welded to the end surface of the positive electrode plate extending from one end of the electrode assembly (70), and the upper current collecting plate (2) had a thickness of 0.4 mm and a radius of 14.5 mm and was formed of a steel plate plated with nickel to a thickness of 5 μm. It included a circular hole formed at the center thereof, 8 (4 slits (2-2)) 0.5 mm knobs (2-3) (for engagement with the electrode) and projections (2-1) for welding. A disk-shaped lower current collecting plate (negative electrode current collecting plate) (100) was resistance-welded to the end surface of the negative electrode plate extending from the other end of the wound electrode assembly. The lower current collecting plate (100) was 0.4 mm thick and was formed of a nickel-plated steel plate. A bottomed cylindrical battery container (60), formed of nickel-plated steel plate, was prepared and the electrode assembly (70) attached to the current collecting plates was placed in the battery container (60) with the positive electrode current collecting plate (2) arranged at the open end of the battery container (60) and the negative electrode current collecting plate (100) arranged in contact with the bottom of the battery container (60). The central portion (100-2) of the negative electrode current collecting plate (100) was resistance-welded to the wall of the battery container (60). A predetermined amount of an electrolyte solution in the form of an aqueous solution containing 6.8 N KOH and 0.8 N LiOH was then injected into the battery container (60).

A 0.3 mm-thick nickel-plated cold rolled steel plate (Material Code: SPCC/JISG3141) was blanked and formed into a lead (21) having a shape as shown in FIG. 1.

A disk-shaped lid (50), formed of a nickel-plated steel plate and having a circular hole of 0.8 mm in diameter formed at the center thereof, was prepared. The 16 projections (21-3) of the lead (21), each 0.5 mm high, were held in contact with the inner surface of the lid (50) and were resistance-welded to the inner surface. In this manner, the lead (21) was electrically connected to the inner surface of the lid (50). A safety valve rubber (pressure release valve) (90) and a cap-shaped positive electrode terminal (80) were attached to the outer surface of the lid (50). A ring-shaped gasket was fitted about the periphery of the lid (50).

The lid (50) was placed on top of the electrode plate assembly (70) with the 8 projections (31-1) of the lead (21) attached to the lid (50) held in contact with the positive electrode current collecting plate (2). The open end of the battery container (60) was caulked to seal the battery container (60) airtight. Subsequently, the battery was compressed to adjust its total height. In this step, the compression of the battery was adjusted so that the lead was compressed (longitudinally displaced) by 0.9 mm. After the adjustment of the total height of the battery, the distance between the lid (50) and the positive electrode current collecting plate (2) was such that a pressure of 35 N (280 N for 8 projections) would apply evenly to each of the points of contact between the projections (31-1) of the lead (21) and the positive electrode current collecting plate (2). As shown in FIG. 9, it had been confirmed in advance that the lead could undergo elastic deformation if compressed by an amount not exceeding 0.7 mm (at which a compressive stress of 33.8 N applies to each projection, totaling to 270 N for 8 projections), and that the compression greater than 0.7 mm exceeds the elastic deformation range of the lead and the variation of the stress (pressure) caused by the compression would decrease beyond this point.

While the lead was put under compressive stress, the points of contact between the lead and the upper current collecting plate were welded by applying pulses of alternating current. As the welding current, 662.5 A/point (5.3 kA for 8 points of contact) of alternating current was applied. The current was applied in 10 cycles of short wave pulses, each consisting of 2.08 msec of current passed in the direction of charge and 2.08 msec in the direction of discharge. Specific procedure is described below.

Welding output terminals of a resistance welder were brought into contact with the cap (80) (positive electrode terminal) and the bottom of the battery container (60) (negative electrode terminal). Conditions for applying current were set so that the same amount of current flow both in the charge direction and in the discharge direction. Specifically, the current value was set to be 662.5 A/point (5.3 kA for 8 points of contact) and the length of time for which the current would be passed in the charge direction was set to be 2.08 msec, as was the time for which the current would be passed in the discharge direction. This gave a single cycle of alternating current. A total of 10 cycles of the rectangular pulses of alternating current was applied. It was then confirmed that gas was not generated to increase the pressure above the valve-opening pressure.

Figure 5:
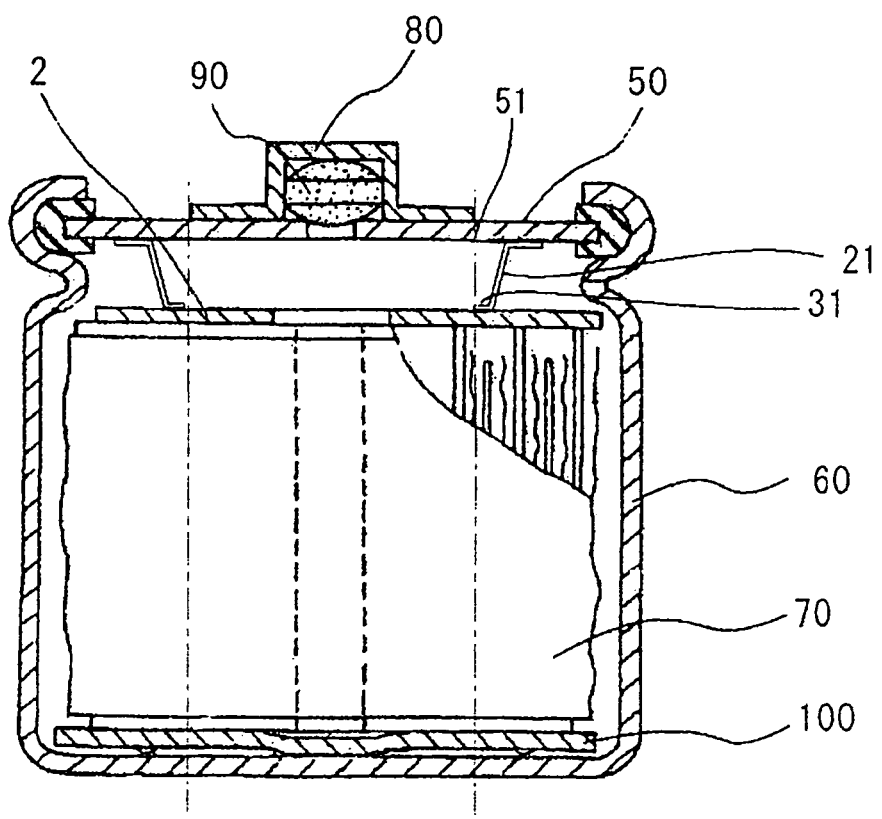
FIG. 5 is a diagram showing one example of sealed battery in which the lead, including the frame, and the side wall and the bottom portion with slits formed therein, is welded to the lid and the upper current collecting plate.
Figure 6:
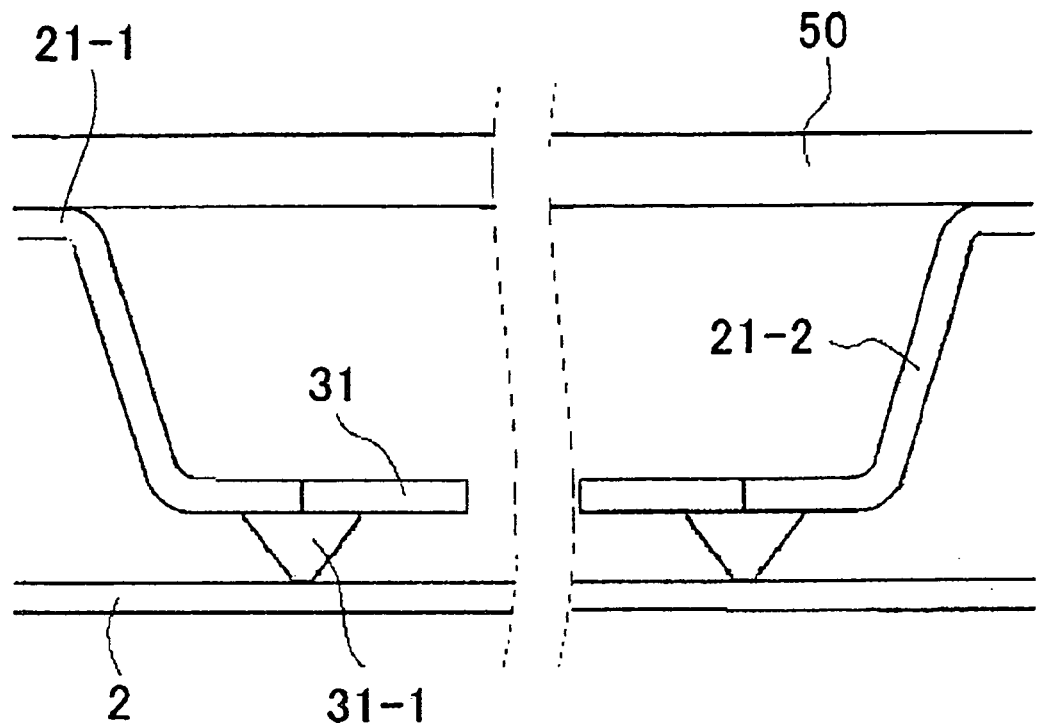
FIG. 6 is a diagram showing one example of welding the lid-welded lead to the upper current collecting plate, in which the displacement along the height (for an electrode assembly with a standard height) is absorbed by the bending portions of the lead between the slits formed in the side wall and the bottom portion.

This completed a sealed nickel-hydride rechargeable battery as shown in FIG. 5 in which the lid (50) was connected to the positive electrode current collecting plate (2) via the dish-shaped lead (21). The electrode assembly of this battery had a standard height (51.7 mm). As shown in FIG. 6, the side wall (21-2) and the bottom portion (31) of the lead (21) were not deformed in this battery. This battery was assigned to be an Example battery 1-1.

In a similar battery, a metal mold was inserted into the crimped portion between the lid (50) and the battery container (60) to increase the total height of the battery by 0.2 mm. This removed the compressive stress applied to the lead. This battery was assigned to be an Example battery 1-2.

In another battery, a metal mold was inserted into the crimped portion between the lid (50) and the battery container (60) to increase the total height of the battery by 0.5 mm and thus remove the compressive stress of the lead. This battery was assigned to be an Example battery 1-3.

Each of the batteries used in Examples and Comparative Examples of the present invention weighed 176 g.

(Chemical Composition, Measurement of Internal Resistance and Power Density)

Each of the sealed rechargeable batteries was left for 12 hours at an ambient temperature of 25° C. Subsequently, the batteries were charged at 130 mA (0.02 ItA) to 1200 mAh, and then at 650 mA (0.1 ItA) for 10 hours. The batteries were then discharged at 1300 mA (0.2 ItA) to a cut voltage of 1 V. Subsequently, the batteries were again charged at 650 mA (0.1 ItA) for 16 hours and then discharged at 1300 mA (0.2 ItA) to a cut voltage of 1.0 V. This sequence of charge/discharge steps completed a single cycle. The batteries were subjected to a total of 4 cycles of charge/discharge sequences. After the discharge step of the fourth cycle, the internal resistance was measured using a 1 kHz alternating current.

The power density was measured as follows: a single battery was left in a 25° C. atmosphere. From the completely discharged state, the battery was charged at 650 mA (0.1 ItA) for 5 hours. The battery was then discharged at 60 A for 12 seconds and the voltage of the battery at 10 seconds was measured and assigned as a 60 A-discharge voltage at 10 seconds. The battery was again charged at 6 A to compensate for the discharged capacity and then discharged at 90 A for 12 seconds. The voltage at 10 seconds was measured and assigned as a 90 A-discharge voltage at 10 seconds. The battery was again charged at 6 A to compensate for the discharged capacity and then discharged at 120 A for 12 seconds. The voltage at 10 seconds was measured and assigned as a 120 A-discharge voltage at 10 seconds. The battery was again charged at 6 A to compensate for the discharged capacity and then discharged at 150 A for 12 seconds. The voltage at 10 seconds was measured and assigned as a 150 A-discharge voltage at 10 seconds. The battery was again charged at 6 A to compensate for the discharged capacity and then discharged at 180 A for 12 seconds. The voltage at 10 seconds was measured and assigned as a 180 A-discharge voltage at 10 seconds.

These voltages-at-10-seconds were linearly approximated by the least square method with respect to the current and the voltage. Assuming that the voltage was E0 and the slope was RDC when the current was 0 A, the power density of the battery at 25° C. at a cut voltage of 0.8 V was determined by the following equation:

Power Density (W/kg)=($E0$−0.8)÷$RDC$×0.8÷battery weight (kg)

Example 2

Figure 7:
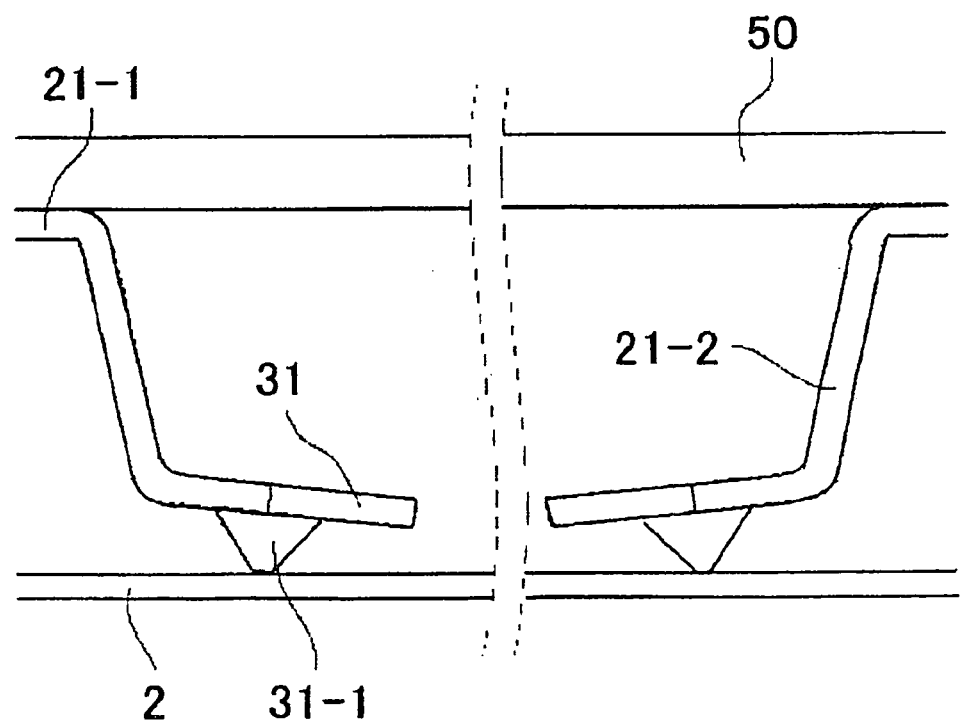
FIG. 7 is a diagram showing another example of welding the lid-welded lead to the upper current collecting plate, in which the displacement along the height (for an electrode assembly with a decreased height) is absorbed by the bending portions of a lead member between the slits formed in the side wall and the bottom portion.

An Example battery 2-1 (no stress removal), an Example battery 2-2 (stress removed by 0.2 mm displacement) and an Example battery 2-3 (stress removed by 0.5 mm displacement) were prepared in the same manner as in Example 1, except that the height of the electrode assembly used (51.55 mm) was 0.15 mm lower than the height of the electrode assembly of Example 1. In these batteries, the slits (21-4) shown in FIG. 1 formed in the side wall (21-2) and the bottom portion (31) of the lead (21) narrow inward, and the portions of the lead between the slits (21-4) are bent so that they stretch along the height, as shown in FIG. 7. In this manner, the changes in the height can be absorbed, so that the upper current collecting plate (2) and the lead (21) are pressed against each other by optimum pressure, facilitating firm welding of the upper current collecting plate (2) to the lead (21).

Example 3

Figure 8:
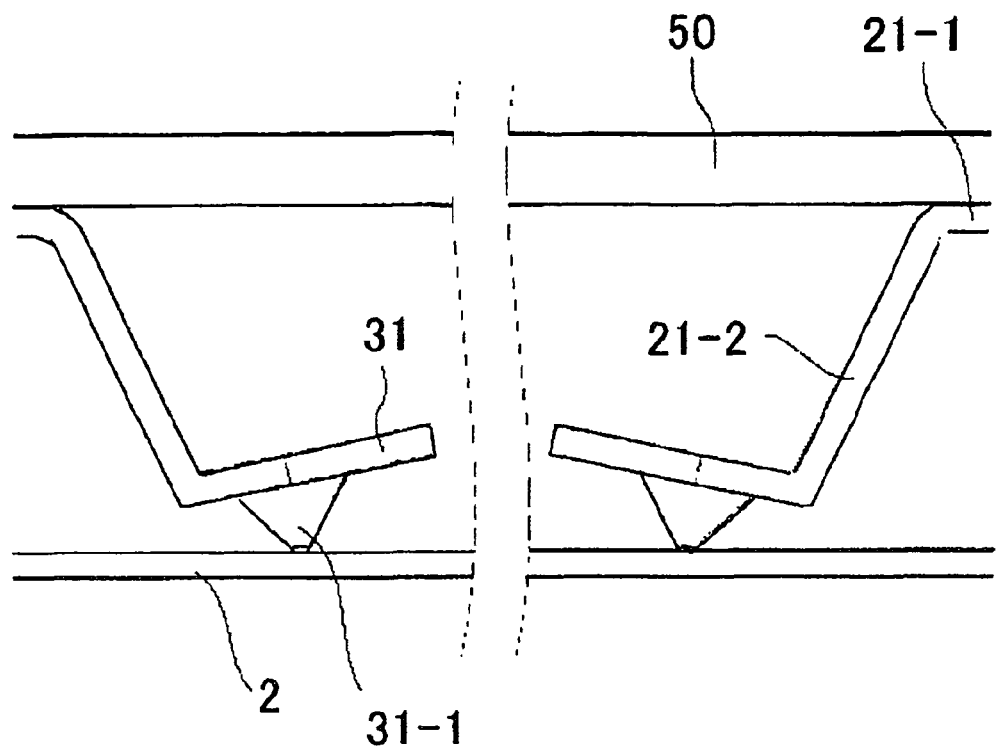
FIG. 8 is a diagram showing another example of welding the lid-welded lead to the upper current collecting plate, in which the displacement along the height (for an electrode assembly with an increased height) is absorbed by the bending portions of the lead member between the slits formed in the side wall and the bottom portion.

An Example battery 3-1 (no stress removal), an Example battery 3-2 (stress removed by 0.2 mm displacement) and an Example battery 3-3 (stress removed by 0.5 mm displacement) were prepared in the same manner as in Example 1, except that the height of the electrode assembly used (51.85 mm) was 0.15 mm higher than the height of the electrode assembly of Example 1. In these batteries, the slits (21-4) shown in FIG. 1 formed in the side wall (21-2) and the bottom portion (31) of the lead (21) narrow inward, and the portions of the lead between the slits (21-4) are bent so that they are compressed along the height, as shown in FIG. 8. In this manner, the positional changes in the height can be absorbed, so that the upper current collecting plate (2) and the lead (21) are pressed against each other by optimum pressure, facilitating firm welding of the upper current collecting plate (2) to the lead (21).

Comparative Example 1

A Comparative Example battery 1-1 (no stress removal), a Comparative Example battery 1-2 (stress removed by 0.2 mm displacement) and a Comparative Example battery 1-3 (stress removed by 0.5 mm displacement) were prepared by adjusting the total height of each battery so that the lead would be compressed (displaced along the height) by 0.3 mm and the distance between the lid and the positive electrode terminal was such that a pressure of 12.9 N (103 N for 8 projections) would apply evenly to each of the points of contact between the projections and the current collecting plate. As shown in FIG. 9, it had been confirmed in advance that the lead could undergo elastic deformation if compressed by an amount not exceeding 0.7 mm and that the stress would be proportional to the compression as long as the compression was 0.7 mm or less.

The welding current was 500 A/point (4.0 kA for 8 points of contact). Specifically, 10 cycles of short wave pulses of alternating current, each of which consists of 2.08 msec of current passed in the charge direction and 2.08 msec in the discharge direction, were applied.

Comparative Example 2

Comparative Example batteries 2-1 (no stress removal), 2-2 (stress removed by 0.2 mm displacement) and 2-3 (stress removed by 0.5 mm displacement) were prepared in the same manner as in Comparative Example 1, except that the height of the electrode assembly used (51.55 mm) was 0.15 mm lower than the height of the electrode assembly of Comparative Example 1.

Comparative Example 3

Comparative Example batteries 3-1 (no stress removal), 3-2 (stress removed by 0.2 mm displacement) and 3-3 (stress removed by 0.5 mm displacement) were prepared in the same manner as in Comparative Example 1, except that the height of the electrode assembly used (51.85 mm) was 0.15 mm higher than the height of the electrode assembly of Comparative Example 1.

Comparative Example 4

Comparative Example batteries 4-1 (no stress removal), 4-2 (stress removed by 0.2 mm displacement) and 4-3 (stress removed by 0.5 mm displacement) were prepared in the same manner as in Comparative Example 1, except that a carbon steel for making springs (SWO-A), instead of the cold-rolled steel plate (Material Code: SPCC/JISG3141), was used as the lead.

As shown in FIG. 9, it had been confirmed in advance that the lead could undergo elastic deformation if compressed by an amount not exceeding 1.2 mm and that the stress (pressure) would be proportional to the compression (displacement) as long as the compression was 1.2 mm or less.

Comparative Example 5

Comparative Example batteries 5-1 (no stress removal), 5-2 (stress removed by 0.2 mm displacement) and 5-3 (stress removed by 0.5 mm displacement) were prepared in the same manner as in Comparative Example 4, except that the height of the electrode assembly used (51.55 mm) was 0.15 mm lower than the height of the electrode assembly of Comparative Example 4.

Comparative Example 6

Comparative Example batteries 6-1 (no stress removal), 6-2 (stress removed by 0.2 mm displacement) and 6-3 (stress removed by 0.5 mm displacement) were prepared in the same manner as in Comparative Example 1, except that the height of the electrode assembly used (51.85 mm) was 0.15 mm higher than the height of the electrode assembly of Comparative Example 1.

Example 4

Example batteries 4-1 (no stress removal), 4-2 (stress removed by 0.2 mm displacement) and 4-3 (stress removed by 0.5 mm displacement) were prepared in the same manner as in Example 1, except that nickel with a purity of 99% (N201 1/2H), instead of the cold-rolled steel plate (Material Code: SPCC/JISG3141), was used as the lead.

As shown in FIG. 9, it had been confirmed in advance that the lead could undergo elastic deformation if compressed by an amount not exceeding 0.7 mm (at which a compressive stress of 31 N applies to each projection, totaling to 248 N for 8 projections), and that the compression greater than 0.7 mm exceeds the elastic deformation range of the lead and the variation of the stress (pressure) caused by the compression (displacement) would decrease beyond this point.

Example 5

Example batteries 5-1 (no stress removal), 5-2 (stress removed by 0.2 mm displacement) and 5-3 (stress removed by 0.5 mm displacement) were prepared in the same manner as in Example 4, except that the height of the electrode assembly used (51.55 mm) was 0.15 mm lower than the height of the electrode assembly of Comparative Example 4.

Example 6

Example batteries 6-1 (no stress removal), 6-2 (stress removed by 0.2 mm displacement) and 6-3 (stress removed by 0.5 mm displacement) were prepared in the same manner as in Example 4, except that the height of the electrode assembly used (51.85 mm) was 0.15 mm higher than the height of the electrode assembly of Comparative Example 4.

(Determination of Non-Defective and Defective Products)

10 batteries were prepared for each of Examples and Comparative examples and their internal resistance was measured. A battery was determined to be non-defective if the deviation of its internal resistance from the median internal resistance was 0.01 mΩ or less. The medians of the internal resistances of each type of batteries are shown in Table 1.

A battery was determined to be defective if the deviation of its internal resistance from the median internal resistance was greater than 0.01 mΩ (3 or more out of 8 points of contact are not properly welded). The average resistances of defective batteries are shown in Table 1 for Examples and Comparative Examples.

The proportions of defective products in the 10 batteries of Examples and Comparative Examples are also shown in Table 1.

TABLE 1

| | | Internal resistance (mΩ) | | | | | | | | | |
|---|---|---|---|---|---|---|---|---|---|---|---|
| | | Median resistance | | Internal resistance | | | | | Lead conditions | | |
| | | | Stress | | Stress | Stress | | | | | |
| Type | Materials | No stress removal | removed by 0.5 mm displacement | No stress removal | removed by 0.2 mm displacement | removed by 0.5 mm displacement | Power density (W/kg) | Height of electrodes (mm) | Compression of lead | Type of compression | Defective products |
| Example 1 | Cold-rolled steel plate (SPCC) | 0.88 | 0.88 | 0.88 | 0.88 | 0.88 | 1540 | 0 | 0.9 | Irreversible compression | 0% |
| Example 2 | Cold-rolled steel plate (SPCC) | 0.88 | 0.88 | 0.88 | 0.88 | 0.88 | 1540 | −0.15 | 1.05 | Irreversible compression | 0% |
| Example 3 | Cold-rolled steel plate (SPCC) | 0.88 | 0.88 | 0.88 | 0.88 | 0.88 | 1540 | 0.15 | 0.75 | Irreversible compression | 0% |
| Comp. Ex. 1 | Cold-rolled steel plate (SPCC) | 0.88 | 0.88 | 0.88 | 0.88 | 0.88 | 1540 | 0 | 0.3 | Elastic compression | 0% |
| Comp. Ex. 2 | Cold-rolled steel plate (SPCC) | 0.88 | 0.88 | 0.91 | 0.92 | 0.93 | 1480 to 1540 | −0.15 | 0.45 | Elastic compression | 20% |
| Comp. Ex. 3 | Cold-rolled steel plate (SPCC) | 0.88 | 0.88 | 0.9 | 0.91 | 0.92 | 1500 to 1540 | 0.15 | 0.15 | Elastic compression | 20% |
| Comp. Ex. 4 | Carbon steel for making springs (SWO-A) | 0.90 | 0.90 | 0.89 | 0.89 | 0.89 | 1530 | 0 | 0.9 | Elastic compression | 0% |
| Comp. Ex. 5 | Carbon steel for making springs (SWO-A) | 0.90 | 0.90 | 0.92 | 0.95 | 0.95 | 1440 to 1530 | −0.15 | 1.05 | Elastic compression | 40% |
| Comp. Ex. 6 | Carbon steel for making springs (SWO-A) | 0.90 | 0.90 | 0.9 | 0.92 | 0.93 | 1480 to 1530 | 0.15 | 0.75 | Elastic compression | 30% |
| Example 4 | 99% nickel (N201 1/2H) | 0.86 | 0.86 | 0.86 | 0.86 | 0.86 | 1620 | 0 | 0.9 | Irreversible compression | 0% |

TABLE 1-continued

| | | Internal resistance (mΩ) | | | | | | | | | |
|---|---|---|---|---|---|---|---|---|---|---|---|
| | | Median resistance | | Internal resistance | | | | | | | |
| | | Stress | | Stress | Stress | | | Lead conditions | | | |
| Type | Materials | No stress removal | removed by 0.5 mm displacement | No stress removal | removed by 0.2 mm displacement | removed by 0.5 mm displacement | Power density (W/kg) | Height of electrodes (mm) | Compression of lead | Type of compression | Defective products |
| Example 5 | 99% nickel (N201 1/2H) | 0.86 | 0.86 | 0.86 | 0.86 | 0.86 | 1620 | −0.15 | 1.05 | Irreversible compression | 0% |
| Example 6 | 99% nickel (N201 1/2H) | 0.86 | 0.86 | 0.86 | 0.86 | 0.86 | 1620 | 0.15 | 0.75 | Irreversible compression | 0% |

(Compression Characteristics of Leads)

The compression characteristics of the leads used are shown in Table 2.

TABLE 2

| | | Pressure on 8 points (N) | | | Pressure on 1 point (N) | | |
|---|---|---|---|---|---|---|---|
| | | SPCC | Spring steel | Ni plate | SPCC | Spring steel | Ni plate |
| Displacement (mm) | 0.1 | 29 | 27.0 | 24.0 | 3.6 | 3.4 | 3.0 |
| | 0.2 | 60 | 62.0 | 48.0 | 7.5 | 7.8 | 6.0 |
| | 0.3 | 103 | 100.0 | 80.0 | 12.9 | 12.5 | 10.0 |
| | 0.4 | 140 | 150.0 | 120.0 | 17.5 | 18.8 | 15.0 |
| | 0.5 | 200 | 195.0 | 168.0 | 25.0 | 24.4 | 21.0 |
| | 0.6 | 234 | 240.0 | 216.0 | 29.3 | 30.0 | 27.0 |
| | 0.7 | 270 | 283.0 | 248.0 | 33.8 | 35.4 | 31.0 |
| | 0.8 | 275 | 330.0 | 256.0 | 34.4 | 41.3 | 32.0 |
| | 0.9 | 280 | 380.0 | 260.0 | 35.0 | 47.5 | 32.5 |
| | 1.0 | 285 | 440.0 | 264.0 | 35.6 | 55.0 | 33.0 |
| | 1.1 | 288 | 480.0 | 268.0 | 36.0 | 60.0 | 33.5 |
| | 1.2 | 290 | 520.0 | 272.0 | 36.3 | 65.0 | 34.0 |

(Difference Between Elastic Compression Region and Non-Elastic Compression Region)

No defective products occurred in any of Examples 1 through 3. In these examples, the batteries had an internal resistance of 0.88 mΩ, which did not vary by the removal of the compressive stress by the 0.2 mm or 0.5 mm displacement of the lead.

No defective products occurred in Comparative Example 1, either.

In comparison, 20% of batteries were proved to be defective in Comparative Example 2 in which the electrode assembly was 0.15 mm lower.

The proportion of defective batteries was also 20% in Comparative Example 3 in which the electrode assembly was 0.15 mm higher.

No defective products occurred in Comparative Example 4.

40% of batteries were proved to be defective in Comparative Example 5 in which the electrode assembly was 0.15 mm lower.

30% of batteries were proved to be defective in Comparative Example 6 in which the electrode assembly was 0.15 mm higher.

The comparison among Example 1 and Comparative Examples 1 and 4 shows that no defective products occur by varying the height of the electrode assembly by 0.15 mm when the welding is performed with the lead compressed by an amount that exceeds its elastic deformation range as in Example 1, whereas defective products occur by varying the height of the electrode assembly by 0.15 mm when the welding is performed with the lead compressed within its elastic deformation range, as in Comparative Examples 1 and 4.

This observation suggests that varying the height of the electrode assembly is likely to result in a greater variation in the pressure exerted to the points of contact when the welding is performed using a lead that retains elasticity. Thus, even if an optimum welding current is provided for a particular pressure that is applied to the points of contact, the amount of heat generated at the points of contact may vary significantly, deviating from the optimum range, since the pressure exerted to the points of contact tends to vary due to the variation in the height of the electrode assembly.

In the defective products produced when the points of contact were exposed to a relatively low pressure (Comparative Examples 2 and 5 with 0.15 mm lower electrode assemblies), the welds at the points of contact of the leads were splashed, forming poor contacts; this can be considered due to a large amount of heat generation from the increased contact resistance.

The defective products produced when the points of contact were exposed to a relatively high pressure (Comparative Examples 3 and 6 with 0.15 mm higher electrode assemblies) were also disassembled and examined. It turned out that in these batteries, the welds at the points of contact of the leads formed poor contacts due to insufficient melting. This can be considered due to a small amount of heat generation from the decreased contact resistance.

As compared to the defective products produced when the points of contact were exposed to a relatively low pressure (with 0.15 mm lower electrode assemblies), the defective products produced when the points of contact were exposed to a relatively high pressure (with 0.15 mm higher electrode assemblies) each have a lower resistance closer to the resistance of the non-defective products. This can be considered that the defective points of contact in these batteries are not caused by splashing, so that compression contacts are still maintained.

It was demonstrated that the removal of compressive stress increased the resistance of the defective products and thereby facilitated their detection (Comparative Example batteries 2-2, 2-3, 3-2, 3-3, 5-2, 5-3, 6-2, 6-3). This is considered to be because the contact resistance was increased as a result of the removal of compressive stress. The removal of compressive stress did not cause variation in the resistance in non-defective batteries (Example batteries 1-1 through 1-3, 2-1 through 2-3, 3-1 through 3-3, Comparative Example batteries 1-1 through 1-3, 4-1 through 4-3).

(Pure Nickel Leads)

The use of the pure nickel leads further decreased the resistance of the batteries due to their decreased resistance (Examples 4 through 6).

The batteries using the pure nickel leads showed a similar tendency to the batteries of Comparative Examples 1 through 3 both in terms of the occurrence of defects observed when the lead was compressed within its elastic deformation range, or by an amount not exceeding 0.7 mm, and in terms of the readiness of the detection of defective products resulting from the removal of compressive stress.

INDUSTRIAL APPLICABILITY

As described above, the manufacturing method and the leads of the present invention can provide batteries with significantly low resistance and decrease the occurrence of defective products. Such batteries are suitable for use in electric power tools, electric automobiles and other applications that repeats charge and discharge at a high rate.

The invention claimed is:

1. A method for manufacturing a battery, characterized by comprising the steps of:
    placing in a battery container an electrode assembly including a positive electrode plate and a negative electrode plate;
    arranging an upper current collecting plate electrically connected to one of said electrodes of the electrode assembly on said electrode assembly;
    bringing a lead previously welded to the inner surface of a lid in contact with said upper current collecting plate; and
    welding a point of contact between said lead and said upper current collecting plate, in that
    the point of contact between said lead and said upper current collecting plate is welded by passing a current between a positive electrode terminal and a negative electrode terminal of the battery, while said lead is subjected to a compressive stress exceeding the elastic deformation range of the lead.

2. The method according to claim 1, characterized in that said lead is a nickel-plated cold rolled steel plate.

3. The method according to claim 1, characterized in that said lead is a nickel plate having 99% or a higher purity.

4. The method according to claim 1, characterized in that said compressive stress is in the range of 30 N to 40 N per point of contact between said lead and said upper current collecting plate.

5. The method according to claim 1, characterized in that
    said lead includes a platelike frame and a side wall that obliquely extends downward from the inner periphery of said frame in a narrowing fashion;
    said side wall includes peripherally spaced-apart slits formed longitudinally from the lower end thereof;
    said frame is welded to the inner surface of said lid; and
    the point of contact between said lead and said upper current collecting plate is arranged at the lower end portion of said side wall.

6. The method according to claim 5, characterized in that
    said lead further includes a bottom portion that extends from the inner periphery of the lower end of said side wall;
    said side wall and said bottom portion include peripherally spaced-apart slits formed longitudinally from the lower end thereof; and
    the point of contact between said lead and said upper current collecting plate is arranged in said bottom portion.

7. The method according to claim 1, characterized by further comprising the step of:
    subsequent to the step of welding the point of contact between said lead and said upper current collecting plate, displacing the lead by 0.2 mm or greater amount in a direction that releases the compressive stress applied to said lead and removing the stress.

* * * * *